US010971146B2

(12) United States Patent
Kobayashi et al.

(10) Patent No.: US 10,971,146 B2
(45) Date of Patent: Apr. 6, 2021

(54) SPEECH INTERACTION DEVICE

(71) Applicant: Toyota Jidosha Kabushiki Kaisha, Toyota (JP)

(72) Inventors: Hideki Kobayashi, Miyoshi (JP); Akihiro Muguruma, Nagoya (JP); Yukiya Sugiyama, Toyota (JP); Shota Higashihara, Chiryu (JP); Riho Matsuo, Nagoya (JP); Naoki Yamamuro, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 196 days.

(21) Appl. No.: 16/234,912

(22) Filed: Dec. 28, 2018

(65) Prior Publication Data

US 2019/0214003 A1 Jul. 11, 2019

(30) Foreign Application Priority Data

Jan. 9, 2018 (JP) .............................. JP2018-001495

(51) Int. Cl.
*G10L 15/22* (2006.01)
*H04R 3/12* (2006.01)
*H04R 1/40* (2006.01)
*H04R 3/00* (2006.01)
*G01S 3/80* (2006.01)
*G01S 3/802* (2006.01)

(52) U.S. Cl.
CPC .............. *G10L 15/22* (2013.01); *G01S 3/802* (2013.01); *G01S 3/8003* (2013.01); *H04R 1/403* (2013.01); *H04R 3/005* (2013.01); *H04R 3/12* (2013.01); *G10L 2015/223* (2013.01); *H04R 2499/13* (2013.01)

(58) Field of Classification Search
CPC ....... G10L 15/22; G10L 15/24; G10L 21/028; G10L 21/0272; G10L 21/057; G10L 2021/02165; G10L 2021/02166; G10L 2021/02
USPC .......................... 704/246, 250, 272, 278, 500
See application file for complete search history.

(56) References Cited

U.S. PATENT DOCUMENTS

| | | | |
|---|---|---|---|
| 9,060,224 B1* | 6/2015 | List | H04R 1/323 |
| 9,580,028 B2 | 2/2017 | Buck et al. | |
| 10,475,454 B2* | 11/2019 | Shah | G10L 15/26 |
| 2012/0249785 A1* | 10/2012 | Sudo | H04R 1/406 |
| | | | 348/143 |
| 2015/0346845 A1 | 12/2015 | Di Censo et al. | |
| 2016/0180853 A1 | 6/2016 | VanLund et al. | |
| 2017/0083285 A1 | 3/2017 | Meyers et al. | |
| 2018/0047394 A1* | 2/2018 | Tian | G10L 17/06 |

FOREIGN PATENT DOCUMENTS

CN 106462383 A 2/2017

* cited by examiner

*Primary Examiner* — Qi Han
(74) *Attorney, Agent, or Firm* — Dinsmore & Shohl LLP

(57) ABSTRACT

A speech interaction device includes an ascertaining section and a control section. The ascertaining section ascertains a direction of a speech utterer by audio emitted by the speech utterer. The control section controls directionality of audio output through a speaker when outputting audio toward the speech utterer, such that directionality of audio in the direction ascertained by the ascertaining section is higher than directionality of audio in other directions.

5 Claims, 15 Drawing Sheets

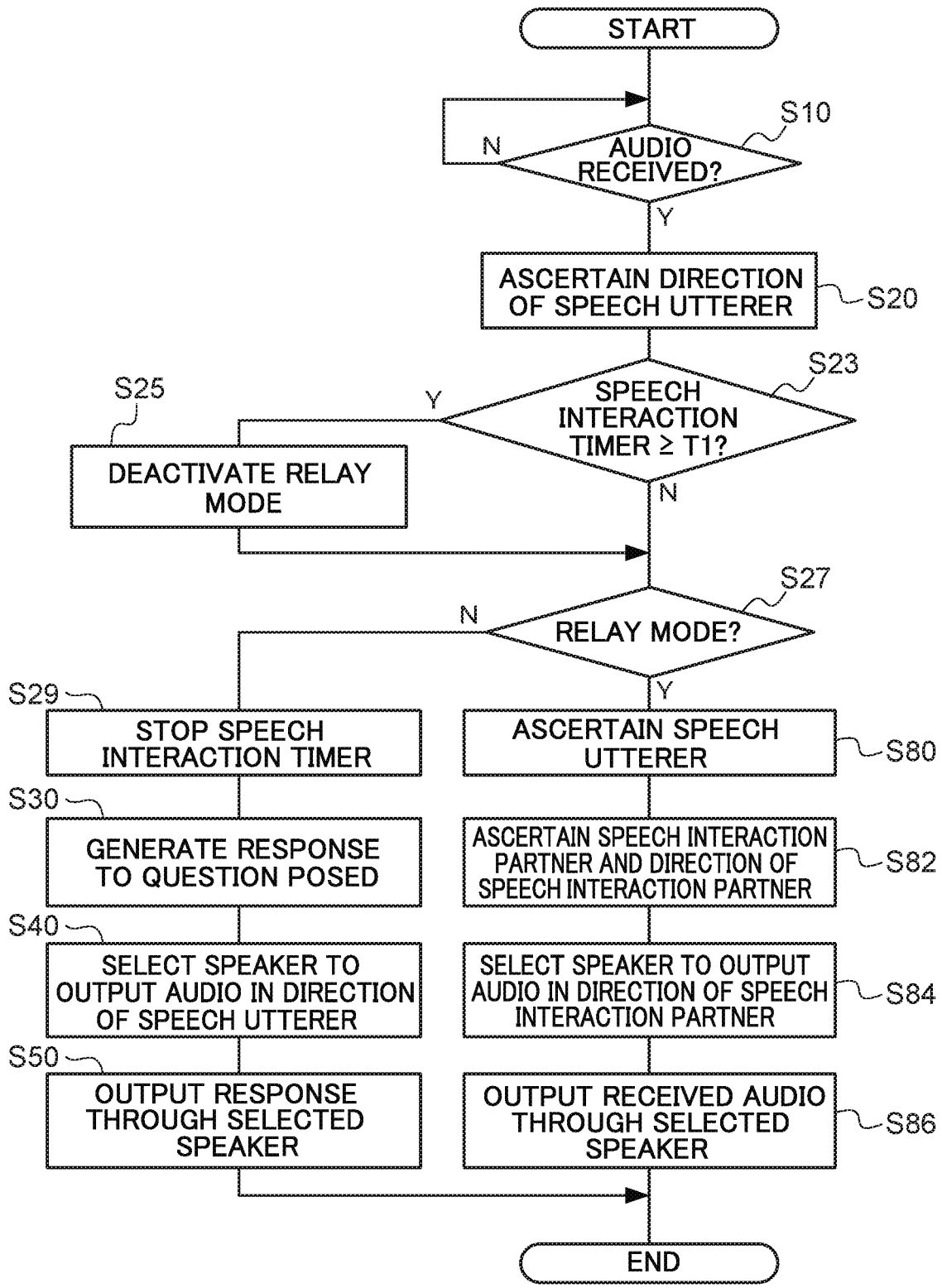

SPEECH INTERACTION DEVICE

CROSS-REFERENCE TO RELATED APPLICATION

This application is based on and claims priority under 35 USC 119 from Japanese Patent Application No. 2018-001495 filed on Jan. 9, 2018, the disclosure of which is incorporated by reference herein.

BACKGROUND

Technical Field

The present disclosure relates to a speech interaction device.

Related Art

U.S. Pat. No. 9,580,028, for example, discloses an audio processing device in which a speech utterer is ascertained using voice recognition technology, and the speech utterer controls vehicle equipment such as a door mirror or a seat position according to predetermined settings.

The audio processing device is able to ascertain the individual who spoke from their voice and operate vehicle equipment according to that individual, but is not able to understand the content of the audio emitted by the speech utterer or interact with the speech utterer. Although the use of artificial intelligence (AI) in speech interaction devices that interact with a speech utterer is becoming more widespread, such speech interaction devices output audio at a predetermined sound volume and in a predetermined direction, regardless of where the speech utterer is. Thus, it is sometimes difficult for the speech utterer, who is the speech interaction partner of the speech interaction device, to hear audio output from the speech interaction device clearly.

SUMMARY

The present disclosure provides a speech interaction device capable of outputting audio that can be heard clearly by a speech interaction partner.

A speech interaction device of a first aspect includes an ascertaining section and a control section. The ascertaining section ascertains a direction of a speech utterer by audio emitted by the speech utterer. The control section controls directionality of audio output through a speaker when outputting audio toward the speech utterer, such that directionality of audio in the direction ascertained by the ascertaining section is higher than directionality of audio in other directions.

The speech interaction device of the first aspect is capable of increasing the directionality of audio output from the speech interaction device in the direction in which the speech utterer is present. The speech interaction device of the first aspect is thus capable of outputting audio that can be heard clearly by a speech interaction partner.

A speech interaction device of a second aspect is the first aspect, wherein the ascertaining section ascertains a direction of a driver driving a vehicle, by audio. Moreover, when information relating to driving of the vehicle has been acquired from a driving assistance device that assists driving of the vehicle, the control section controls directionality of audio output through a speaker such that directionality of audio conveying the information is higher in the direction in which the driver is present as ascertained by the ascertaining section than in another direction.

The speech interaction device of the second aspect is capable of ascertaining the direction of the driver driving the vehicle, and of increasing the directionality of audio conveying information relating to driving of the vehicle toward the direction of the driver. The speech interaction device of the second aspect is thus capable of conveying information relating to driving of the vehicle so as to be heard clearly by the driver.

A speech interaction device of a third aspect is the second aspect, wherein the driving assistance device is a car navigation device pre-installed in the vehicle, or a portable information device including a car navigation function.

The speech interaction device of the third aspect can be connected to the car navigation device pre-installed in the vehicle or to the portable information device including a car navigation function. The speech interaction device of the third aspect is thus capable of conveying information relating to driving of the vehicle so as to be heard clearly by the driver not only when notified from the car navigation device pre-installed in the vehicle but also when notified from the portable information device.

A speech interaction device of a fourth aspect is the first aspect, wherein the ascertaining section ascertains directions of plural people present within earshot of audio output through a speaker, by audio. Moreover, when relaying an interaction between at least two people of the plural people whose directions have been ascertained by the ascertaining section, the control section controls directionality of audio output through a speaker such that directionality of audio of the speech utterer who has spoken is higher in a direction in which a speech interaction partner is present than in another direction.

The speech interaction device of the fourth aspect uses audio to ascertain the direction of each speech interaction partner, and relays audio emitted by one speech interaction partner toward another speech interaction partner. The speech interaction device of the fourth aspect thus enables the voices of the speech interaction partners to be heard more clearly than in cases in which the interaction between the speech interaction partners is not relayed through the speech interaction device.

A speech interaction device of a fifth aspect is the fourth aspect, wherein the control section controls so as to relay audio of respective speech interaction partners from when audio including a statement designating a speech interaction partner is received until the interaction ends.

The speech interaction device of the fifth aspect is capable of understanding whether or not a statement designating a speech interaction partner is included in audio. The speech interaction device of the fifth aspect is thus capable of establishing the start of an interaction from the contents of speech and autonomously starting relay of audio.

A speech interaction device of a sixth aspect is the first aspect, wherein the control section selects a speaker of a plurality of speakers to output audio in the direction in which the speech utterer is present, as ascertained by the ascertaining section, and controls such that the audio is output through the selected speaker.

The speech interaction device of the sixth aspect is capable of outputting audio toward a direction in which a speech utterer is present. The speech interaction device of the sixth aspect is thus capable of outputting audio so as to be heard clearly by a speech interaction partner.

A speech interaction device of a seventh aspect is the first aspect, wherein the control section controls respective sound volumes of plural speakers such that a sound volume of a speaker, of the plurality of speakers, for outputting audio in the direction in which the speech utterer is present, as ascertained by the ascertaining section, is greater than a sound volume of a speaker for outputting audio in another direction.

The speech interaction device of the seventh aspect sets the sound volume of a speaker for outputting audio in the direction in which the speech utterer is present greater than the sound volume of a speaker for outputting audio in another direction that is different to the direction in which the speech utterer is present. The speech interaction device of the seventh aspect is thus capable of outputting audio so as to be heard clearly by a speech interaction partner.

A speech interaction device of an eighth aspect is the sixth aspect, wherein the control section gathers information regarding an easy-to-hear frequency band for each speech utterer, and when outputting audio through a speaker toward each respective speech utterer, controls so as to modulate a predetermined standard sound quality according to the speech utterer such that audio strength within the easy-to-hear frequency band is greater than audio strength within the easy-to-hear frequency band in audio having the predetermined standard sound quality.

The speech interaction device of the eighth aspect modulates the sound quality of the audio output from the speaker to a sound quality that the speech utterer is able to hear clearly, and then outputs the audio toward the speech utterer. This thereby enables output of audio that can be heard more clearly than in cases in which audio is output toward a speech interaction partner at the predetermined sound quality.

A speech interaction device of a ninth aspect is the seventh aspect, wherein the control section gathers information regarding an easy-to-hear frequency band for each speech utterer, and when outputting audio through a speaker toward each respective speech utterer, controls so as to modulate a predetermined standard sound quality according to the speech utterer such that audio strength within the easy-to-hear frequency band is greater than audio strength within the easy-to-hear frequency band in audio having the predetermined standard sound quality.

The speech interaction device of the ninth aspect modulates the sound quality of the audio output from the speaker to a sound quality that the speech utterer is able to hear clearly, and then outputs the audio toward the speech utterer. This thereby enables output of audio that can be heard more clearly than in cases in which audio is output toward a speech interaction partner at the predetermined sound quality.

As described above, the present disclosure exhibits the advantageous effect of enabling output of audio that can be heard clearly by a speech interaction partner.

BRIEF DESCRIPTION OF THE DRAWINGS

Exemplary embodiments will be described in detail based on the following figures, wherein:

FIG. 15 is a flowchart illustrating an example of a flow of speech interaction processing corresponding to a relay mode.

DETAILED DESCRIPTION

Figure 1:
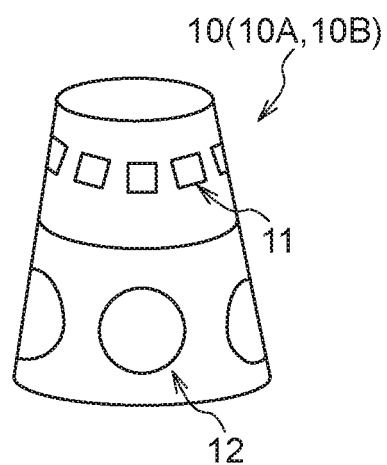
FIG. 1 is a diagram illustrating an example of the external appearance of a speech interaction device.

Detailed explanation follows regarding exemplary embodiments of the present disclosure, with reference to the diagrams. Note that the same reference numerals are appended to equivalent configuration elements and processing in each of the diagrams, and duplicate explanation thereof is omitted.

First Exemplary Embodiment

FIG. 1 is a diagram illustrating an example of an external appearance of a speech interaction device 10 according to a first exemplary embodiment. The speech interaction device 10 is also referred to as an artificial intelligence (AI) speaker or a smart speaker. As illustrated in FIG. 1, for example, plural microphones 11 and plural speakers 12 are disposed running 360 degrees around a side face of the speech interaction device 10 so as encircle the speech interaction device 10.

In the example in FIG. 1, the speech interaction device 10 has a cone-shaped profile with the top of the cone being cut off along a plane intersecting the height direction of the cone; however, the profile of the speech interaction device 10 is not limited thereto. The speech interaction device 10 has a size that enables the speech interaction device 10 to be carried around by a person.

Figure 2:
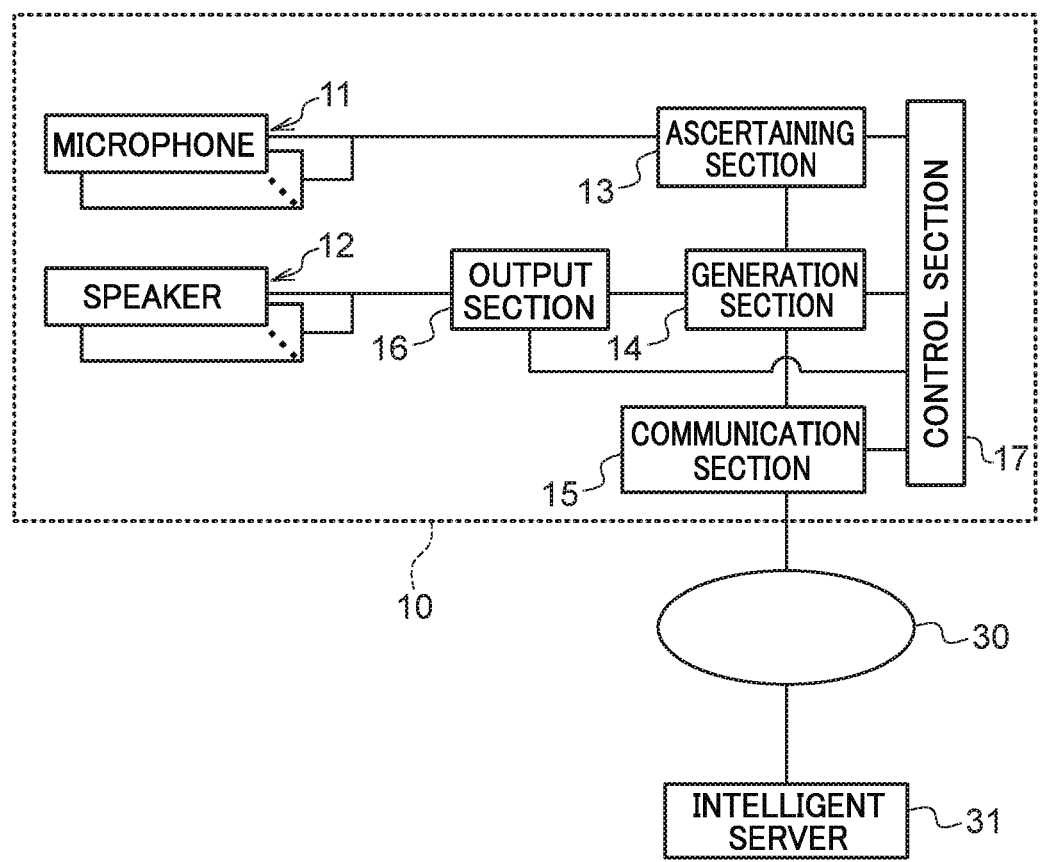
FIG. 2 is a diagram illustrating an example of configuration of a speech interaction device according to a first exemplary embodiment.

FIG. 2 is a configuration diagram illustrating an example of a functional configuration of the speech interaction device 10. The speech interaction device 10 includes the plural microphones 11, the plural speakers 12, an ascertaining section 13, a generation section 14, a communication section 15, an output section 16, and a control section 17.

Audio picked up by the microphones 11 is converted to audio signals by the respective microphones 11 and passed to the ascertaining section 13.

The ascertaining section 13 acquires an audio strength, representing the audio intensity, from the audio signals passed from each of the microphones 11, and thereby ascertains the direction from which the audio was emitted. Since audio picked up by a microphone 11 mounted facing toward the direction from which the audio was emitted tends to have the highest audio strength, the ascertaining section 13 can ascertain the direction from which the audio was emitted by analyzing the audio strength of the audio signals passed from each of the microphones 11.

Some embodiments employ a speech interaction device 10 in which directional microphones are employed as the microphones 11, and in which the microphones 11 are disposed around a side face of the speech interaction device 10 so as to encircle the speech interaction device 10 with sound capture regions of the respective the microphones 11 overlapping each over as little as possible.

The ascertaining section 13 notifies the control section 17, described later, of the ascertained direction of the audio, and, for example, passes the audio signal from the microphone 11 that picked up the audio from the ascertained direction to the generation section 14.

The generation section 14 analyzes the content of the audio expressed by the audio signal passed from the ascertaining section 13, and generates a response phrase corresponding to the audio content. Specifically, for example, the generation section 14 generates a response phrase appropriate to the audio content by exchanging data with an intelligent server 31 via the communication section 15 that includes a communication protocol to connect to a communication line 30 such as the Internet.

Various information is stored in the intelligent server 31, and the intelligent server 31 transmits information requested by the speech interaction device 10 to the speech interaction device 10. Note that the intelligent server 31 may, for example, have a cloud computing-based configuration.

For example, in a case in which the generation section 14 receives an audio signal from the ascertaining section 13 with the content "What's the weather in Tokyo today?", electronic text requesting the current day's weather in Tokyo is generated and transmitted to the intelligent server 31. If the information "Sunny" is received from the intelligent server 31 in response, based on the content of the audio received from the ascertaining section 13 and the information received from the intelligent server 31, the generation section 14 generates a response phrase such as "The weather in Tokyo today is sunny" using a predetermined learning model.

The generation section 14 sometimes also employs the predetermined learning model to establish the content of the audio received from the ascertaining section 13. For example, a multilayer neural network in which weightings between neurons are learnt in advance by deep learning using a combination of teacher signals and input signals is employed as the learning model.

After the generation section 14 has converted the content of the audio received from the ascertaining section 13 into text using a known method, for example, morphological analysis is performed on the text, and the text is divided into morphemes. The generation section 14 then inputs each of the morphemes in the text that has been divided into morphemes into the learning model, enabling the generation section 14 to establish the content of the text.

The generation section 14 is able to generate a response to the content of the phrase expressed by the audio received from the ascertaining section 13 by, for example, inputting both the morphemes in the text expressed by the audio received from the ascertaining section 13 and the information received from the intelligent server 31 into the learning model.

In this manner, the generation section 14 generates a response phrase corresponding to the audio content expressed by the audio signal received from the ascertaining section 13 by employing artificial intelligence that artificially replicates human reasoning and judgements based on learning of human knowledge and based on various information.

The generation section 14 passes the generated response phrase to the output section 16.

The output section 16 converts the response phrase generated by the generation section 14 into an audio signal using known voice synthesis processing, and outputs the converted audio signal to the speakers 12. In this manner, a response to audio containing an instruction or a question posed to the speech interaction device 10 picked up by the microphones 11 is output through the speakers 12 as audio.

When the output section 16 converts the response phrase to an audio signal, the output section 16 employs audio with a standard predetermined sound quality (hereafter referred to as "standard audio"). Namely, the pitch and vocalization speed configuring the sound quality of the audio output through the speakers 12 conforms to the sound quality of the standard audio.

Note that the output section 16 follows an instruction from the control section 17 regarding at least one out of the audio strength of the audio or the speakers used to output the audio.

The control section 17 acquires information required for control from the respective functional sections of the ascertaining section 13, the generation section 14, the communication section 15, and the output section 16, and controls the processing of the respective functional sections based on the acquired information.

Specifically, the control section 17 acquires the direction of the emitted audio, namely, the direction of the person who spoke (hereafter referred to as the "speech utterer") from the ascertaining section 13. When a predetermined type of statement is included in the audio picked up by the microphones 11, the control section 17 acquires an analysis result of the audio content from the generation section 14. The control section 17 also acquires information such as whether or not the data communication contains a communication failure from the communication section 15. The control section 17 also acquires a receipt notification reporting the fact that that the response phrase from the generation section 14 has been received by the output section 16, from the output section 16.

Figure 3:
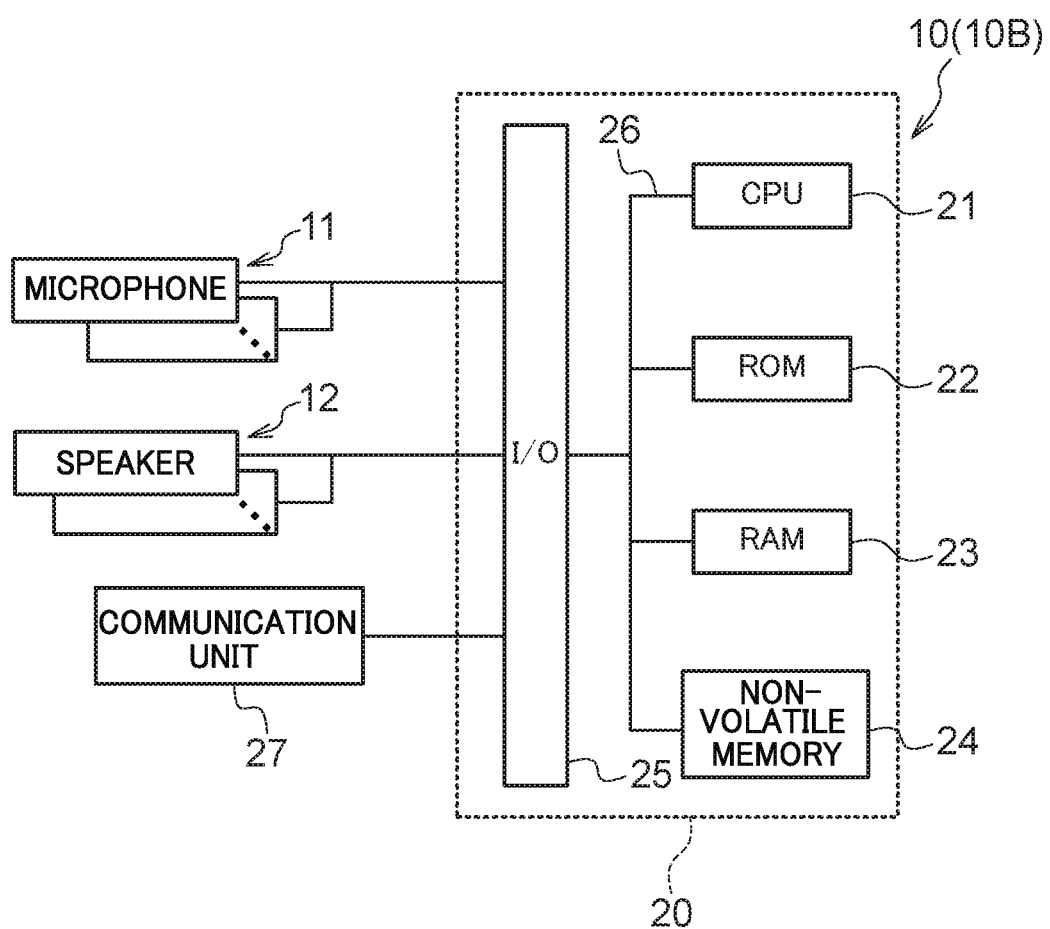
FIG. 3 is a diagram illustrating an example of configuration of relevant portions of an electrical system of a speech interaction device according to the first exemplary embodiment and a speech interaction device according to a third exemplary embodiment.

The speech interaction device 10 illustrated in FIG. 2 may be implemented by a computer, for example. FIG. 3 is a diagram illustrating an example of configuration of relevant portions of an electrical system of the speech interaction device 10 when configured by a computer 20.

The computer 20 includes a central processing unit (CPU) 21, read only memory (ROM) 22, random access memory (RAM) 23, non-volatile memory 24, and an input/output interface (I/O) 25. The CPU 21, the ROM 22, the RAM 23, the non-volatile memory 24, and the I/O 25 are connected together by a bus 26. Note that there is no limitation to the operating system employed by the computer 20, and any kind of operating system may be employed.

The CPU 21 functions as the ascertaining section and the control section of the speech interaction device 10. For example, a program executed by the CPU 21 is stored in the ROM 22. The RAM 23 is used as a work area where data generated by the processing of the CPU 21 is temporarily stored.

The non-volatile memory 24 is an example of a storage device that retains stored information even when power supplied to the non-volatile memory 24 is cut off, such that the information is not deleted. For example, a hard disk that uses semiconductor memory may be employed as the non-volatile memory 24.

For example, the plural microphones 11, the plural speakers 12, and a communication unit 27 are connected to the I/O 25 of the computer 20.

The communication unit 27 is a device for implementing functions corresponding to the communication section 15. Plural communication protocols are installed in the communication unit 27 so as to enable both wired and wireless connection modes with the communication line 30. The communication unit 27 may also be installed with a communication protocol for communicating with an information device nearby (within approximately 100 meters), such as Bluetooth (registered trademark), or a communication protocol for communicating with an information device in close proximity (within approximately 10 centimeters), such as near field communication (NFC).

Note that the units connected to the I/O 25 are not limited to the respective units illustrated in FIG. 3, and various other devices may be connected thereto as required. For example, an input unit that is connected to buttons and a touch panel for converting user operation of the speech interaction device 10 to electric signals to be passed to the CPU 21, as well as to an output terminal of an external information device, and that notifies the CPU 21 of output from the external information device, may be connected to the I/O 25. Alternatively, a display unit such as a liquid crystal display or an organic electro luminescence (EL) display that notifies a user of information processed by the CPU 21 may be connected to the I/O 25.

Figure 4:
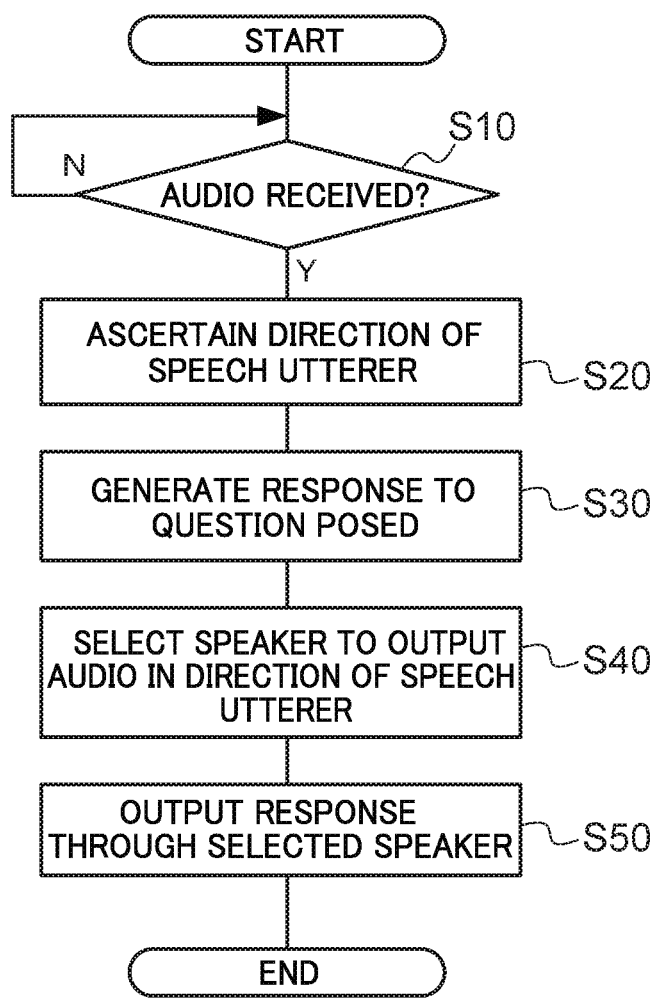
FIG. 4 is a flowchart illustrating an example of a flow of speech interaction processing in a speech interaction device according to the first exemplary embodiment.

Explanation follows regarding operation of the speech interaction device 10 according to the first exemplary embodiment, with reference to FIG. 4. FIG. 4 is a flowchart illustrating an example of a flow of speech interaction processing executed by the CPU 21 when, for example, the power source of the speech interaction device 10 has been turned on.

A speech interaction program defining the speech interaction processing is pre-stored in the ROM 22 of the speech interaction device 10, for example. The CPU 21 reads the speech interaction program stored in the ROM 22 to execute the speech interaction processing.

First, at step S10, the CPU 21 determines whether or not audio has been received from at least one microphone 11 out of the plural microphones 11. In cases in which audio has not been received from any of the microphones 11, the processing of step S10 is repeatedly executed in order to monitor for the receipt of audio.

In cases in which audio has been received from at least one of the microphones 11, processing transitions to step S20.

At step S20, the CPU 21 acquires the audio strength of the audio for each microphone 11 from which audio was received at step S10, and ascertains the direction from which the audio was emitted in order to ascertain the direction of the speech utterer.

Specifically, from the perspective of the speech interaction device 10, the direction in which the microphone 11 that picked up the audio with the highest audio strength is disposed is taken to correspond to the direction of the speech utterer. The ascertained direction of the speech utterer is stored in the RAM 23, for example.

At step S30, the CPU 21 analyzes the content of the audio received at step S10 using the learning model as previously explained, and generates a response phrase corresponding to the received audio content in coordination with the intelligent server 31.

At step S40, the CPU 21 selects a speaker 12 to output the audio in the direction of the speech utterer ascertained at step S20.

Specifically, unique identification numbers that identify each of the microphones 11 and speakers 12 are allocated to each of the plural microphones 11 and the plural speakers 12. A layout table, in which the identification numbers of the microphones 11 are associated with the identification numbers of the speakers 12 that output audio in the direction of the placement positions of the respective microphones 11, is pre-stored in the non-volatile memory 24.

The CPU 21 therefore refers to the layout table to acquire the identification number of the speaker 12 corresponding to the identification number of the microphone 11 that picked up the audio with the highest audio strength. The speaker 12 indicated by the acquired identification number becomes the speaker 12 used to output audio in the direction of the speech utterer.

Note that the direction of the speech utterer stored in the RAM 23 at step S20 is also stored using the identification number of the microphone 11 that picked up the audio with the highest audio strength.

At step S50, the CPU 21 converts the response phrase generated at step S30 to an audio signal using known voice synthesis processing, and outputs the converted audio signal to the speaker 12 selected at step S40. A response to the question posed by the speech utterer to the speech interaction device 10 is thereby output through the speaker 12 selected at step S40. In this case, audio is not output through speakers 12 other than the speaker 12 selected at step S40.

The speaker 12 selected at step S40 is the speaker 12 that outputs audio in the direction of the speech utterer, whereas the speakers 12 that were not selected at step S40 are speakers 12 that output audio in directions other than the direction of the speech utterer. The speech utterer hears the response from the speech interaction device 10 more clearly than, for example, in cases in which the response is output through speakers 12 other than the speaker 12 selected at step S40 from out of the plural speakers 12 in the speech interaction device 10.

Namely, the speech interaction device 10 can control the directionality of the audio output through the speakers 12 such that the directionality of the audio in the direction of the speech interaction partner is greater than the directionality of the audio in other directions. This completes the speech interaction processing illustrated in FIG. 4.

Note that in the speech interaction processing illustrated in FIG. 4, the directionality of the audio output through the speakers 12 is controlled by only outputting audio through the speaker 12 facing toward the direction of the speech interaction partner. However, the control method for increasing the directionality of audio in the direction of the speech interaction partner compared to the directionality of audio in other directions is not limited thereto.

For example, the CPU 21 may output a response to the question posed by the speech utterer to the speech interaction device 10 through each of the speakers 12 after first controlling the sound volume of each of the speakers 12 such that the sound volume of the speaker 12 selected at step S40 is greater than the sound volume of the speakers 12 that were not selected at step S40. Since the sound volume of the audio output in the direction of the speech utterer is greater than that in other directions, the audio output from the speech interaction device 10 in the direction of the speech interaction partner heard more clearly than the audio output in other directions.

In this manner, the speech interaction device 10 according to the first exemplary embodiment ascertains the direction of the speech utterer based on the direction of the audio emitted by the speech utterer, and controls the directionality of the audio output through the speakers 12 such that the directionality of audio in the direction where the speech utterer is present is greater than the directionality of audio in other directions. The speech utterer who has posed a question to the speech interaction device 10 thereby hears the response from the speech interaction device 10 more clearly than in cases in which the response is output through the speakers 12 without controlling the directionality of the audio.

Modified Examples of First Exemplary Embodiment

In the speech interaction device 10 according to the first exemplary embodiment, the directionality of audio output through the speakers is controlled such that the response from the speech interaction device 10 is heard more clearly by a speech interaction partner of the speech interaction device 10. Explanation follows regarding a speech interaction device 10 in which the response from the speech interaction device 10 is made to be heard even more clearly by outputting audio through the speakers 12 using a frequency band that the speech utterer is able to hear clearly.

Note that in this modified example, a situation in which a single speech utterer is interacting with the speech interaction device 10 is given as an example.

Figure 5:
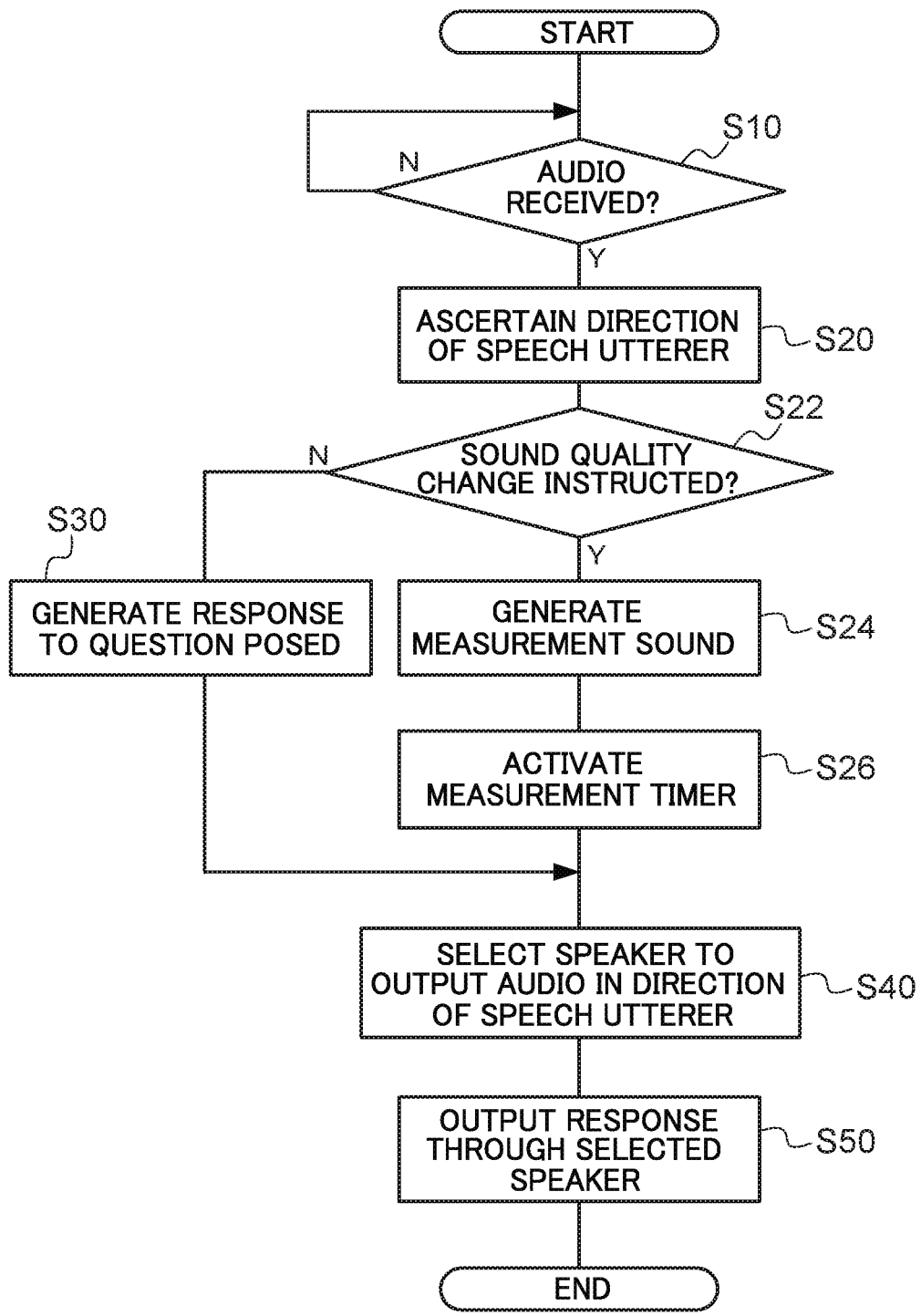
FIG. 5 is a flowchart illustrating an example of a flow of speech interaction processing relating to sound quality modulation.

FIG. 5 is a flowchart illustrating an example of a flow of speech interaction processing executed by the CPU 21 in response to a sound quality change instruction. A speech interaction program defining the speech interaction processing expressed in the flowchart illustrated in FIG. 5 is pre-stored in the ROM 22 of the speech interaction device 10, for example. The CPU 21 reads the speech interaction program stored in the ROM 22 to execute the speech interaction processing.

The flowchart illustrated in FIG. 5 differs from FIG. 4 in the respect that steps S22, S24, and S26 have been added. Other processing is the same as that of the speech interaction processing illustrated in FIG. 4.

Step S22 is executed after the direction of the speech utterer with respect to the speech interaction device 10 has been ascertained at step S20.

At step S22, the CPU 21 analyzes the audio content received at step S10 using the learning model, and determines whether or not an expression representing a sound quality change instruction, such as "I want to change the sound quality", is included in the received audio. Whether or not a sound quality change instruction is included in the received audio may, for example, be determined based on whether or not the expression represented by the received audio matches an expression representing a sound quality change instruction pre-stored in the non-volatile memory 24. Alternatively, morphemes in the phrase indicated by the received audio may be input to the learning model, and determination may be made as to whether or not a sound quality change instruction is included in the audio received by the CPU 21 based on an output result of the learning model. In such cases, for example, the CPU 21 can autonomously determine that "change the sound quality" is a sound quality change instruction, even in cases in which "change the sound quality" is not stored in the non-volatile memory 24 as an expression representing a sound quality change instruction.

In cases in which determination is negative in the determination processing of step S22, namely, in cases in which an expression indicating a sound quality change instruction is not included in the audio received at step S10, processing transitions to step S30, and the same processing as the speech interaction processing illustrated in FIG. 4 is executed thereafter.

In cases in which determination is affirmative in determination processing of step S22, namely, in cases in which an expression indicating a sound quality change instruction is included in the audio received at step S10, processing transitions to step S24.

At step S24, the CPU 21 selects one frequency band from out of plural predetermined frequency bands, and generates a sound at a frequency included in the selected frequency band as a measurement sound.

At step S26, the CPU 21 activates a measurement timer and measures the elapsed time since the measurement timer has been activated. For example, an inbuilt timer function of the CPU 21 may be utilized as the measurement timer.

The CPU 21 then executes steps S40 and S50 previously described, and outputs the measurement sound generated at step S24 through the speaker 12 used to output audio in the direction of the speech utterer. Note that the CPU 21 controls the sound volume of the speaker 12 such that, for example, the measurement sound is initially output through the speaker 12 at a minimum volume, and the sound volume of the measurement sound is then increased over time.

Measurement sound in the frequency band selected at step S24 is thereby output from the speech interaction device 10 toward the speech utterer.

In response thereto, when the measurement sound becomes audible, the speech utterer who has heard the measurement sound emits a measurement-sound-audible response to the speech interaction device 10 to indicate that the measurement sound has been heard. For example, the speech utterer who has heard the measurement sound may say "I can hear you" to the speech interaction device 10. "I can hear you" is an example of a measurement-sound-audible response.

Figure 6:
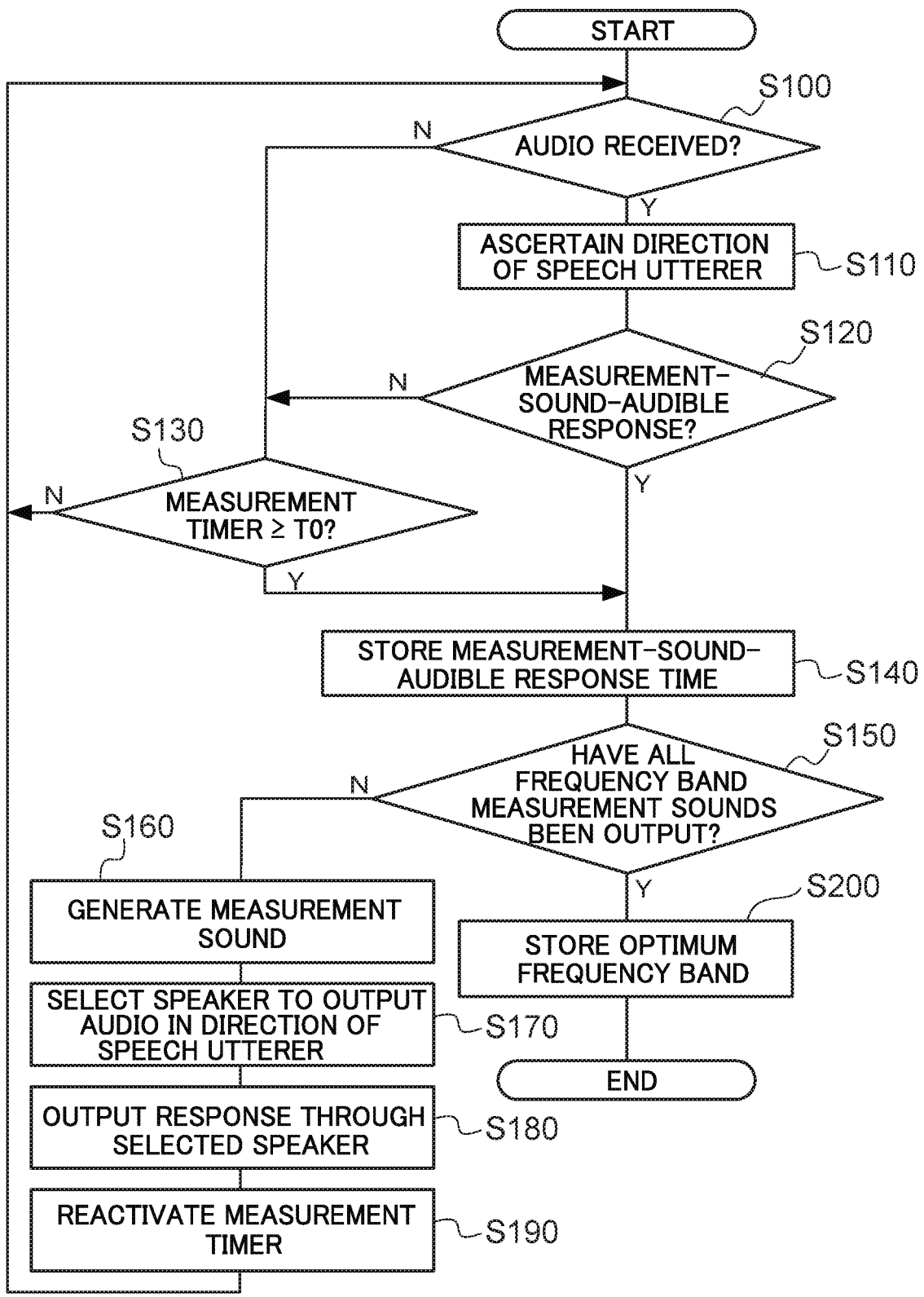
FIG. 6 is a flowchart illustrating an example of a flow of speech interaction processing relating to sound quality modulation.

FIG. 6 is a flowchart illustrating an example of a flow of speech interaction processing executed by the CPU 21 in response to a measurement-sound-audible response after a sound quality change instruction has been received from the speech utterer and a measurement sound has been output from the speech interaction device 10. A speech interaction program defining the speech interaction processing illustrated in the flowchart illustrated in FIG. 6 is pre-stored in the ROM 22 of the speech interaction device 10, for example. The CPU 21 reads the speech interaction program stored in the ROM 22 to execute the speech interaction processing.

At step S100, similarly to at step S10 in FIG. 4, the CPU 21 determines whether or not audio has been received through at least one of the microphones 11. In cases in which audio has not been received, processing transitions to step S130, described later. In cases in which some form of audio has been received, processing transitions to step S110.

At step S110, the CPU 21 ascertains the direction of the speech utterer using a similar method to step S20 in FIG. 4.

At step S120, the CPU 21 analyzes the audio content received at step S100 using the learning model to determine whether or not a measurement-sound-audible response such as "I can hear you" is included in the received audio. In cases in which a measurement-sound-audible response is not included in the audio received at step S100, processing transitions to step S130.

At step S130, the CPU 21 determines whether or not a timer value of the measurement timer activated at step S26 in FIG. 5 is a threshold value T0 or greater. The threshold value T0 is a value used to determine whether or not the measurement sound has been heard, and is derived in advanced by, for example, testing using an actual speech interaction device 10 or computer simulation based on the design specifications of the speech interaction device 10, and is pre-stored in the non-volatile memory 24.

In cases in which the timer value of the measurement timer is less than the threshold value T0, the CPU 21 determines that a possibility remains of a measurement-sound-audible response being emitted by the speech utterer. Processing therefore transitions to step S100, and the CPU 21 monitors for the receipt of audio. In cases in which the timer value of the measurement timer is the threshold value T0 or greater, and also in cases in which the CPU 21 has determined at step S120 that a measurement-sound-audible response is included in the audio received at step S100, processing transitions to step S140.

At step S140, the CPU 21 associates the timer value of the measurement timer with the frequency band of the measurement sound output from the speaker 12, and records this in an audible range table stored in the RAM 23. The timer value of the measurement timer recorded in the audible range table indicates measurement-sound-audible response time indicating the duration between starting output of the measurement sound and the speech utterer responding that they have heard the measurement sound. The shorter the measurement-sound-audible response time, the more clearly the speech utterer was able to hear the sound in the frequency band corresponding to the measurement sound.

At step S150, the CPU 21 determines whether or not measurement sounds have been output corresponding to all of the frequency bands out of the plural predetermined frequency bands. In cases in which a frequency band for which a measurement sound has not yet been generated is present, processing transitions to step S160.

At step S160, the CPU 21 selects one frequency band that has not yet been selected from out of the plural predetermined frequency bands, and generates sound formed from frequencies included in the selected frequency band as a measurement sound.

At step S170, the CPU 21 performs similar processing to that of step S40 in FIG. 4, and selects a speaker 12 to output audio in the direction of the speech utterer ascertained at step S110.

At step S180, the CPU 21 outputs the measurement sound generated at step S160 through the speaker 12 selected at step S170. In such cases also, the CPU 21 controls the sound volume of the speaker 12 such that, for example, the measurement sound is initially output through the speaker 12 at the minimum volume, and the sound volume of the measurement sound is then increased over time.

At step S190, the CPU 21 resets the timer value of the measurement timer to zero, and re-initiates the measurement timer so as to restart time measurement using the measurement timer. Processing then transitions to step S100, and the CPU 21 monitors for a measurement-sound-audible response from the speech utterer in response to the measurement sound corresponding to the new frequency band that has been output through the speaker 12.

The CPU 21 repeats execution of the above processing until measurement sounds corresponding to each of the frequency bands out of the plural predetermined frequency bands have been output through the speaker 12. In cases in which determination is made that measurement sounds corresponding to all of the frequency band have been output via the determination processing of step S150, processing transitions to step S200.

At step S200, the CPU 21 refers to the measurement-sound-audible response time for each of the frequency bands in the audible range table, and stores the frequency band that was heard most clearly by the speech utterer who initiated the sound quality change instruction (hereafter referred to as the "optimum frequency band") in the non-volatile memory 24, for example.

This completes the speech interaction processing relating to measurement-sound-audible responses illustrated in FIG. 6.

Figure 7:
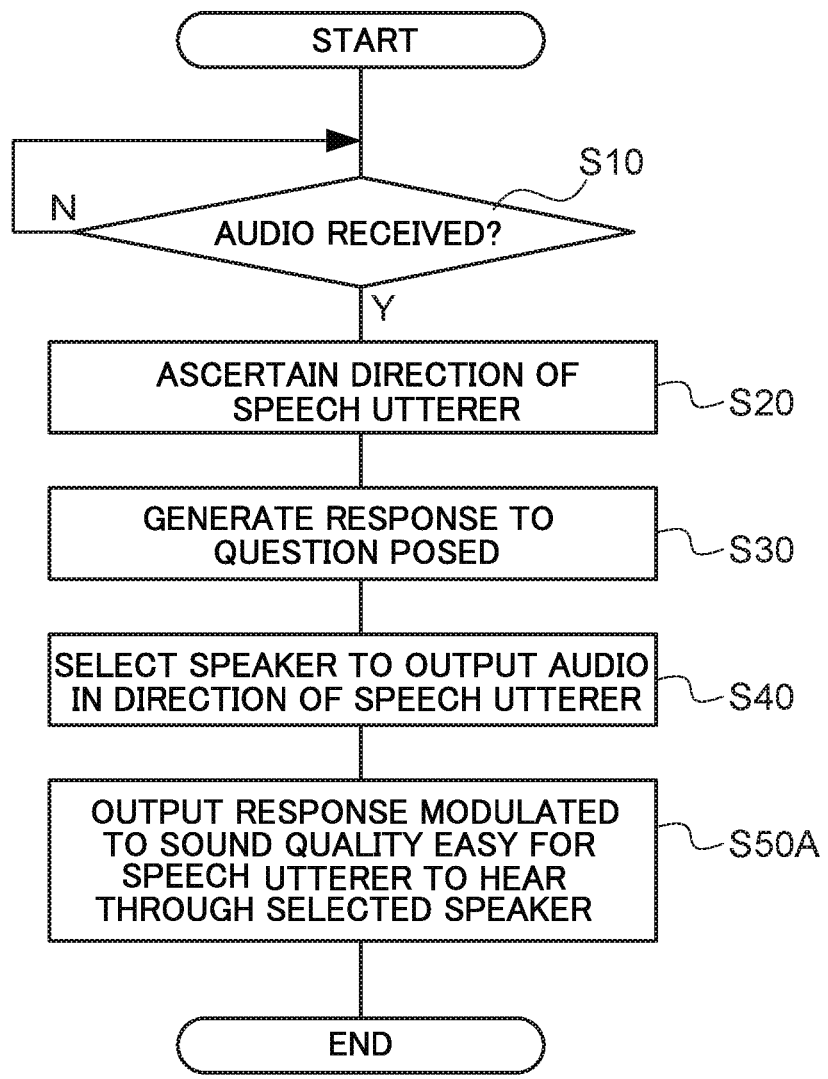
FIG. 7 is a flowchart illustrating an example of a flow of speech interaction processing relating to sound quality modulation.

FIG. 7 is a flowchart illustrating an example of a flow of speech interaction processing executed by the CPU 21 after the speech interaction processing relating to measurement-sound-audible responses illustrated in FIG. 6 has been performed.

A speech interaction program defining the speech interaction processing in the flowchart illustrated in FIG. 7 is pre-stored in the ROM 22 of the speech interaction device 10, for example. The CPU 21 reads the speech interaction program stored in the ROM 22 to execute the speech interaction processing.

The flowchart illustrated in FIG. 7 differs from FIG. 4 in the respect that step S50 is replaced by step S50A. Other processing is the same as that of the speech interaction processing illustrated in FIG. 4.

At step S50A, the CPU 21 converts the response phrase generated at step S30 to an audio signal using known voice synthesis processing, and outputs the converted audio signal to the speaker 12 selected at step S40. When this is performed, the CPU 21 acquires the optimum frequency band for the speech utterer stored at step S200 in FIG. 6 from the non-volatile memory 24, modulates the sound quality of the standard audio such that the audio strength of the audio is higher in the optimum frequency band than in the standard audio, and outputs the modulated audio through the selected speaker 12.

Audio in the optimum frequency band is thereby emphasized over audio in other frequency bands, such that the response from the speech interaction device 10 is heard more clearly by the speech utterer than cases in which a response is output through the speaker 12 using the standard audio. This completes the speech interaction processing illustrated in FIG. 7.

Note that in the flowchart in FIG. 6, the CPU 21 may execute frequency analysis of the audio received at step S100 and associate a frequency analysis result for the audio with the optimum frequency band and store these in the non-volatile memory 24.

In such cases, in the speech interaction processing in FIG. 7, the CPU 21 performs frequency analysis on the audio received at step S10, and acquires the optimum frequency band associated with the frequency analysis result that is closest to the frequency analysis result obtained from the non-volatile memory 24. The CPU 21 may then modulate the sound quality of the standard audio at step S50A using the optimum frequency band acquired from the non-volatile memory 24 based on the frequency analysis result. This enables the speech interaction device 10 to modulate the sound quality of the standard audio for each speech utterer.

Associating the frequency analysis result of the voice of the speech utterer with the optimum frequency band and storing these in the non-volatile memory 24 enables a response to be provided using audio that is heard more clearly than the standard audio by the individual speech utterer who posed a question to the speech interaction device 10.

Second Exemplary Embodiment

In the first exemplary embodiment, there is no particular limitation to the location where the speech interaction device 10 is employed. In a second exemplary embodiment, explanation is given regarding a speech interaction device 10A employed in a vehicle 40.

Figure 8:
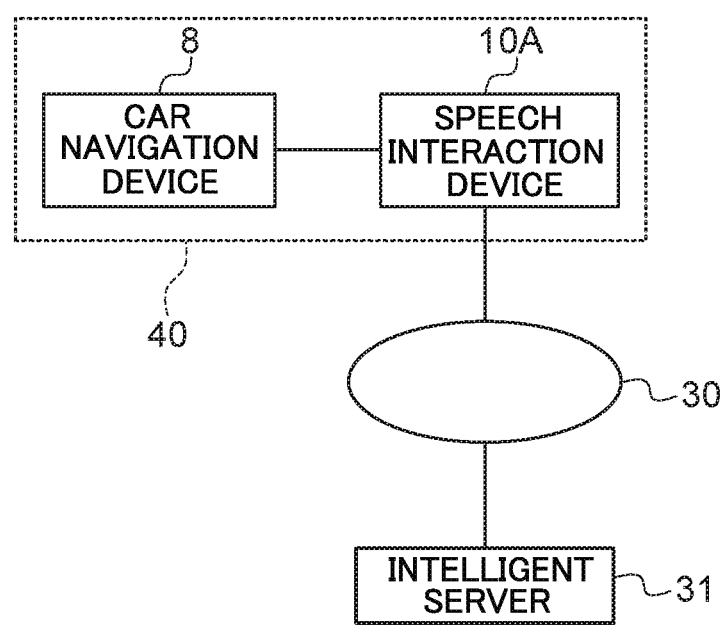
FIG. 8 is a diagram illustrating an example of configuration of a system employing a speech interaction device according to a second exemplary embodiment.

FIG. 8 is a diagram illustrating an example of a system configuration employing the speech interaction device 10A according to the second exemplary embodiment.

As illustrated in FIG. 8, the speech interaction device 10A is brought onboard the vehicle 40, and is connected to a car navigation device 8 installed in a predetermined position inside the vehicle, such as a dashboard. The speech interaction device 10A is connected to the intelligent server 31 through the communication line 30 using a wireless communication protocol.

Note that the connection target of the speech interaction device 10A in the vehicle 40 is not limited to the car navigation device 8, and the speech interaction device 10A may be connected to another device, such as an electronic control unit (ECU) that controls an electronic device installed in the vehicle 40. The car navigation device 8 and the ECU are examples of driving assistance devices.

Figure 9:
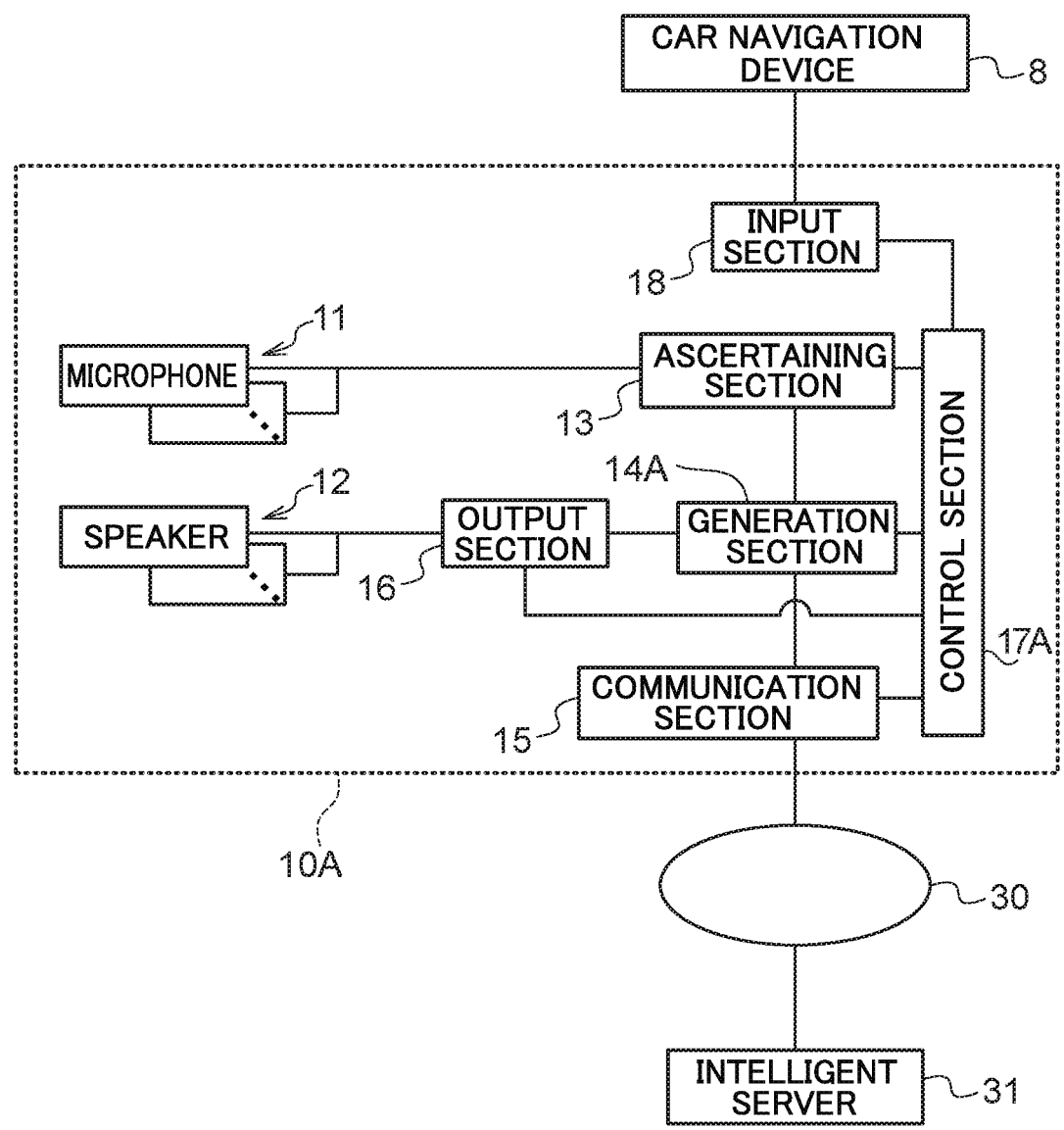
FIG. 9 is a diagram illustrating an example of configuration of a speech interaction device according to the second exemplary embodiment.

FIG. 9 is a configuration diagram illustrating an example of functional configuration of the speech interaction device 10A. The configuration of the speech interaction device 10A illustrated in FIG. 9 differs from the configuration of the speech interaction device 10 according to the first exemplary embodiment illustrated in FIG. 2 in the respects that an input section 18 has been added, and the generation section 14 and the control section 17 are respectively replaced by a generation section 14A and a control section 17A.

The input section 18 receives assistance information for assisting driving of the vehicle 40 output from the car navigation device 8. The assistance information includes, for example, the direction of progress of the vehicle 40, a change in the direction of progress of the vehicle 40, the current position of the vehicle 40, and the speed of the vehicle 40.

The input section 18 passes the assistance information received from the car navigation device 8 to the control section 17A.

In addition to the processing performed by the control section 17 of the speech interaction device 10, on receiving assistance information from the input section 18, the control section 17A also controls the generation section 14A so as to generate a phrase addressing the driver of the vehicle 40 in order to ascertain the direction of the driver from the perspective of the speech interaction device 10A. The control section 17A also passes the assistance information received through the input section 18 to the generation section 14A.

In addition to the processing performed by the generation section 14 of the speech interaction device 10, on receiving an instruction from the control section 17A to generate a phrase addressing the driver, the generation section 14A also generates a phrase addressing the driver and passes this to the output section 16. On receiving assistance information from the control section 17A, the generation section 14A also generates a phrase for conveying information relating to the assistance information and generates a phrase for conveying the contents of the assistance information content to the driver, in accordance with the content of the assistance information.

Specifically, for example in cases in which the speech interaction device 10A has received the current position of the vehicle 40 as assistance information, the generation section 14A acquires a map including the current position of the vehicle 40 from the intelligent server 31, and generates a phrase such as "Watch your speed" if there is a school located within a predetermined range of the current position of the vehicle 40. In cases in which the speech interaction device 10A has received the current position of the vehicle 40 and the remaining fuel level of the vehicle 40 as the assistance information, and the received remaining fuel level is below a predetermined level, the generation section 14A acquires the location of the nearest refueling station to the current position of the vehicle 40 from the intelligent server 31, and generates a phrase such as "Refuel at the gas station 1 km ahead." In cases in which the speech interaction device 10A has received information relating to the direction of progress of the vehicle 40, such as "Right turn 100 m ahead" as the assistance information, the generation section 14A compiles a phrase using the information relating to the direction of progress, and generates a phrase that is easy for the driver to understand, such as "Turn right at the intersection 100 m ahead". In cases in which information is obtained from the intelligent server 31 conveying that an intersection 100 meters ahead is an intersection where accidents are more common than at other intersections, a phrase such as "Accident-prone intersection—Proceed with caution" may be added.

The phrase generated by the generation section 14A corresponding to the assistance information content is referred to as a "driving assistance phrase".

Figure 10:
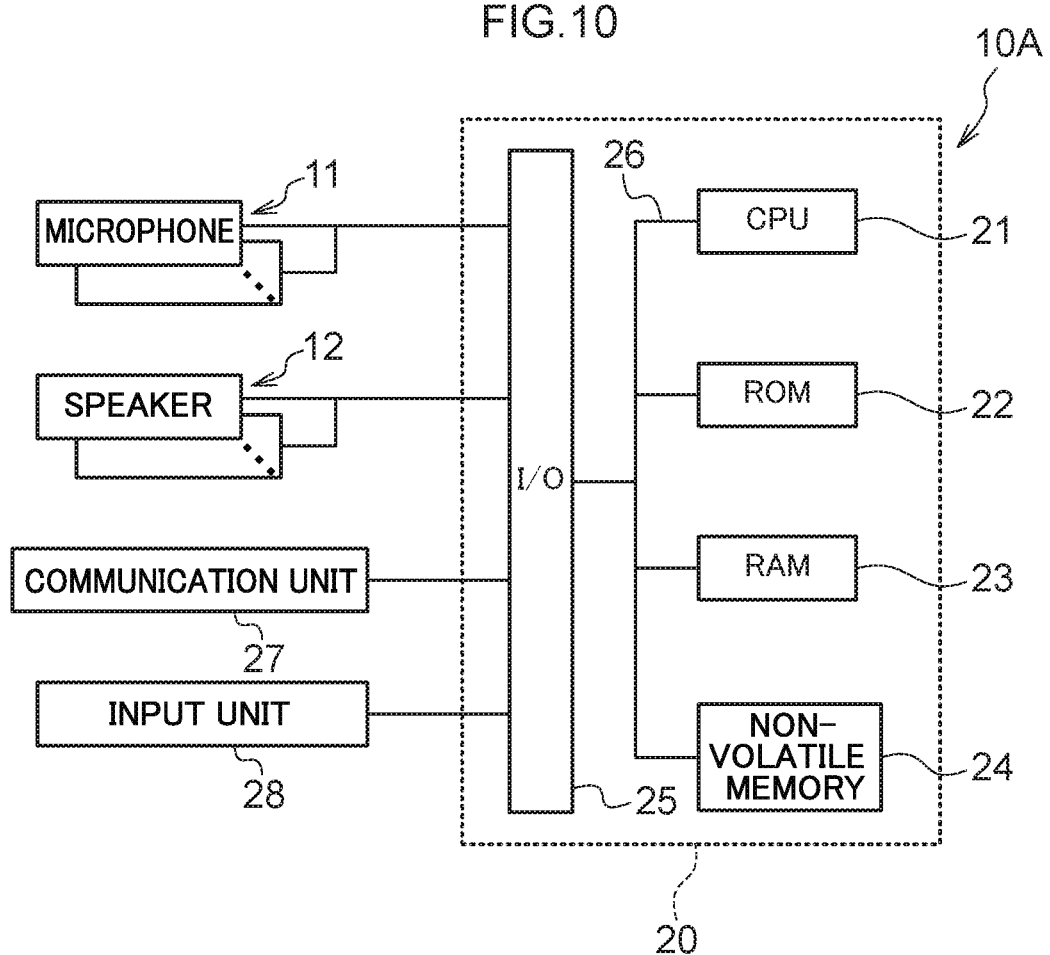
FIG. 10 is a diagram illustrating an example of configuration of relevant portions of an electrical system of a speech interaction device according to the second exemplary embodiment.

The speech interaction device 10A illustrated in FIG. 9 may be implemented by a computer. FIG. 10 is a diagram illustrating an example of configuration of relevant portions of an electrical system of the speech interaction device 10A when configured by a computer 20.

The configuration example of the relevant portions illustrated in FIG. 10 differs from the configuration example of relevant portions of the speech interaction device 10 according to the first exemplary embodiment illustrated in FIG. 3 in the respect that the speech interaction device 10 has a wired connection, via a connector, with an input unit 28 that receives assistance information from the car navigation device 8. Other configuration is the same as that in FIG. 3. Note that in cases in which assistance information is transmitted wirelessly from the car navigation device 8 and so on, the assistance information is received by the communication unit 27 instead of the input unit 28.

Explanation follows regarding operation of the speech interaction device 10A according to the second exemplary embodiment.

Figure 11:
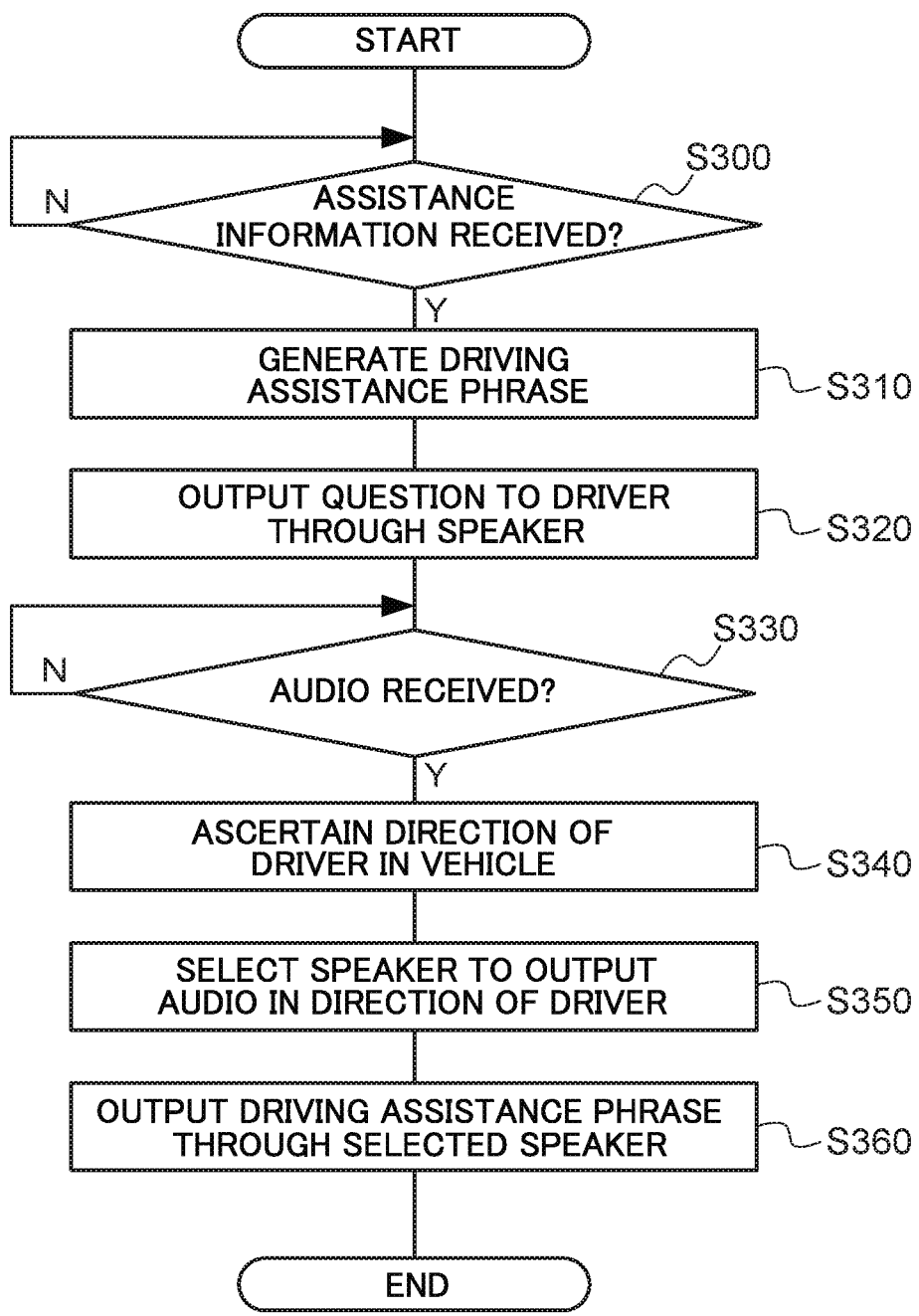
FIG. 11 is a flowchart illustrating an example of a flow of speech interaction processing of a speech interaction device according to the second exemplary embodiment.

FIG. 11 is a flowchart illustrating an example of a flow of speech interaction processing executed by the CPU 21 when, for example, the power source of the speech interaction device 10A has been turned on.

A speech interaction program defining the speech interaction processing in the flowchart illustrated in FIG. 11 is pre-stored in the ROM 22 of the speech interaction device 10A, for example. The CPU 21 reads the speech interaction program stored in the ROM 22 to execute the speech interaction processing.

First, at step S300, the CPU 21 determines whether or not assistance information has been received from the car navigation device 8. In cases in which assistance information has not been received, the processing of step S300 is repeatedly executed to monitor for the receipt of assistance information.

In cases in which assistance information has been received, processing transitions to step S310.

At step S310, the CPU 21 analyzes the content of the assistance information received at step S300 using the learning model, and generates a driving assistance phrase corresponding to the content of the assistance information.

At step S320, the CPU 21 outputs a phrase posing a question to the driver of the vehicle 40, such as "Driver, are you there?" through each of the speakers 12 of the speech interaction device 10A. When this is performed, the CPU 21 may employ an audio signal corresponding to a phrase posing a question to the driver pre-stored in the non-volatile memory 24.

Since a response from the driver such as "Yes" is anticipated in reply to the question posed to the driver, at step S330, the CPU 21 determines whether or not audio has been received through at least one microphone 11, similarly to at step S10 in FIG. 4.

In cases in which audio has been received, at step S340, the CPU 21 ascertains the direction of the driver of the vehicle 40 by ascertaining the direction from which the audio was emitted, using a similar method to that at step S20 in FIG. 4.

At step S350, the CPU 21 selects a speaker 12 to output audio in the direction of the driver ascertained at step S340, similarly to at step S40 in FIG. 4.

At step S360, the CPU 21 converts the driving assistance phrase generated at step S310 into an audio signal using known voice synthesis processing and outputs the converted audio signal through the speaker 12 selected at step S350, similarly to at step S50 in FIG. 4.

This completes the speech interaction processing illustrated in FIG. 11.

In the speech interaction device 10A according to the second exemplary embodiment, the speech interaction device 10A autonomously establishes the position of the driver of the vehicle 40 by posing a question to the driver, and a driving assistance phrase is output through the speaker 12 that outputs audio toward the driver so as to be heard clearly by the driver. The speech interaction device 10A updates the position of the driver every time assistance information is received from the car navigation device 8, thereby enabling the driving assistance phrase notification to be directed toward the driver even if, for example, the position of the speech interaction device 10A has been changed by a passenger of the vehicle 40.

Note that in cases in which the position of the speech interaction device 10A in the vehicle 40 has not changed, there is no need for the speech interaction device 10A to update the position of the driver every time assistance information is received from the car navigation device 8. Thus, after the power source of the speech interaction device 10A has been turned on and the speech interaction device 10A has executed the processing of step S320 to step S340 in FIG. 11 once in order to ascertain the position of the driver, the speech interaction processing may be executed with the processing of step S320 to step S340 in the flowchart in FIG. 11 omitted. This enables the speech interaction device 10A to suppress the number of times that the speech interaction device 10A poses a question to the driver, compared to cases in which the position of the driver is updated every time assistance information is received from the car navigation device 8.

If the position of the speech interaction device 10A does not frequently change, the speech interaction device 10A may update the position of the driver by executing the processing of step S320 to step S340 in FIG. 11 at predetermined intervals of 10 minutes, for example, rather than updating the position of the driver every time assistance information is received from the car navigation device 8. This enables the speech interaction device 10A to update the position of the driver, while suppressing the number of times that the speech interaction device 10A poses a question to the driver in comparison to cases in which the driver position is updated every time assistance information is received from the car navigation device 8.

In the flowchart in FIG. 11, when audio is output from the speech interaction device 10A to the driver, the directionality of the audio output through the speaker 12 is controlled by outputting audio only through the speaker 12 facing toward the direction of the driver. However, the control method used to deliver audio more clearly in the direction of the driver than in other directions is not limited thereto.

For example, as described in the first exemplary embodiment, the CPU 21 may control the sound volume of each of the speakers 12 such that the sound volume of the speaker 12 facing toward the direction of the driver is greater than the sound volume of the other speakers 12.

In the second exemplary embodiment, operation of the speech interaction device 10A has been explained using an example in which the speech interaction device 10A acquires assistance information from the car navigation device 8 or the ECU pre-installed in the vehicle 40; however, the source from which assistance information is acquired is not limited thereto. The speech interaction device 10A may acquire assistance information from a portable information device such as a smartphone installed with an application that implements a car navigation function. Unlike the car navigation device 8, the portable information device is an information device that is brought into the vehicle 40 by a person boarding the vehicle 40, rather than being pre-installed in the vehicle 40.

Third Exemplary Embodiment

In the first exemplary embodiment and the second exemplary embodiment, examples have been given in which a speech utterer interacts with the speech interaction device 10 or the speech interaction device 10A. However, for example, in cases in which the driver and a passenger seated in a rear passenger seat onboard the vehicle are conversing with each other, sometimes utterances of speech interaction partners cannot be heard due to surrounding noise.

Thus, in a third exemplary embodiment, explanation follows regarding a speech interaction device 10B including a relay mode that relays interaction such that utterances of speech interaction partners can be heard clearly.

Figure 12:
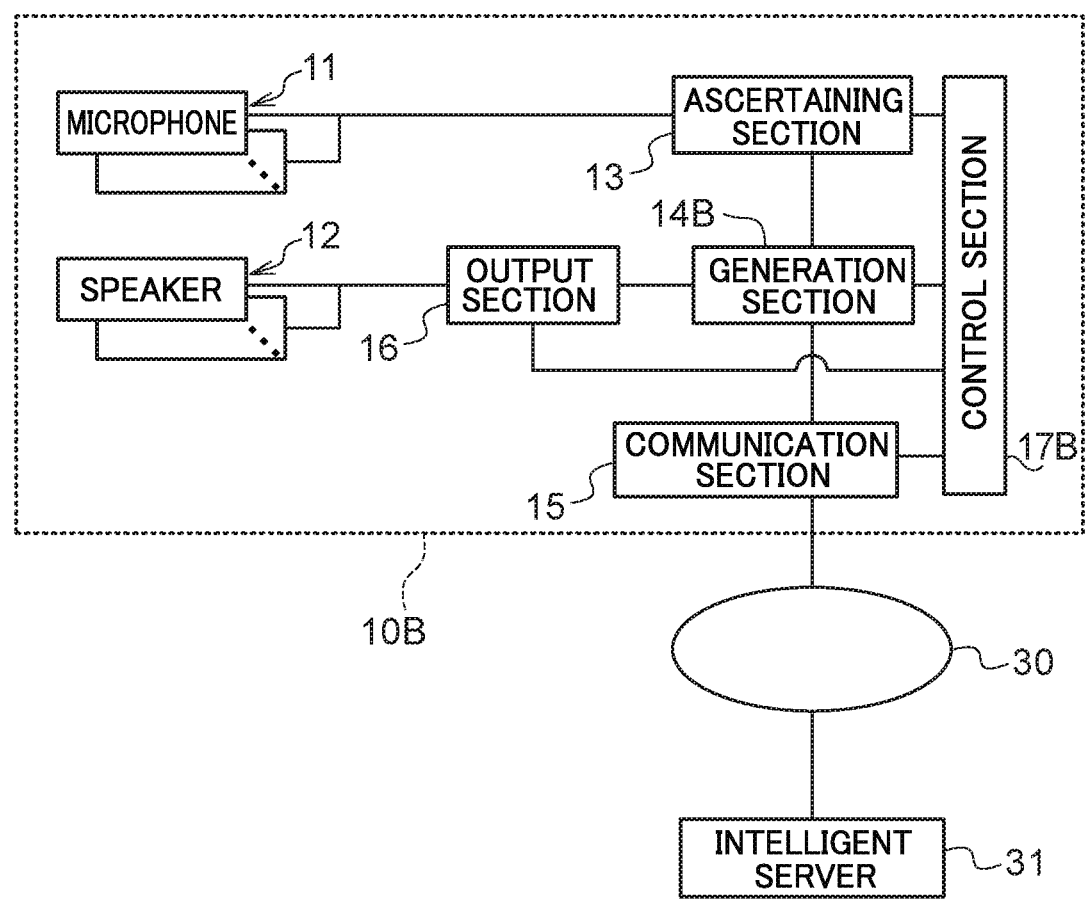
FIG. 12 is a diagram illustrating an example of configuration of a speech interaction device according to the third exemplary embodiment.

FIG. 12 is a configuration diagram illustrating an example of functional configuration of the speech interaction device 10B. The configuration of the speech interaction device 10B illustrated in FIG. 12 differs from the configuration of the speech interaction device 10 according to the first exemplary embodiment illustrated in FIG. 2 in the respect that the generation section 14 and the control section 17 are respectively replaced by a generation section 14B and a control section 17B. Other configuration is the same as the configuration of the speech interaction device 10 according to the first exemplary embodiment.

The speech interaction device 10B may be implemented by a computer 20, for example. For example, configuration of relevant portions of an electrical system of the speech interaction device 10B when configured by the computer 20 has the same configuration as the example of configuration of relevant portions of the electrical system of the speech interaction device 10 according to the first exemplary embodiment illustrated in FIG. 3.

Figure 13:
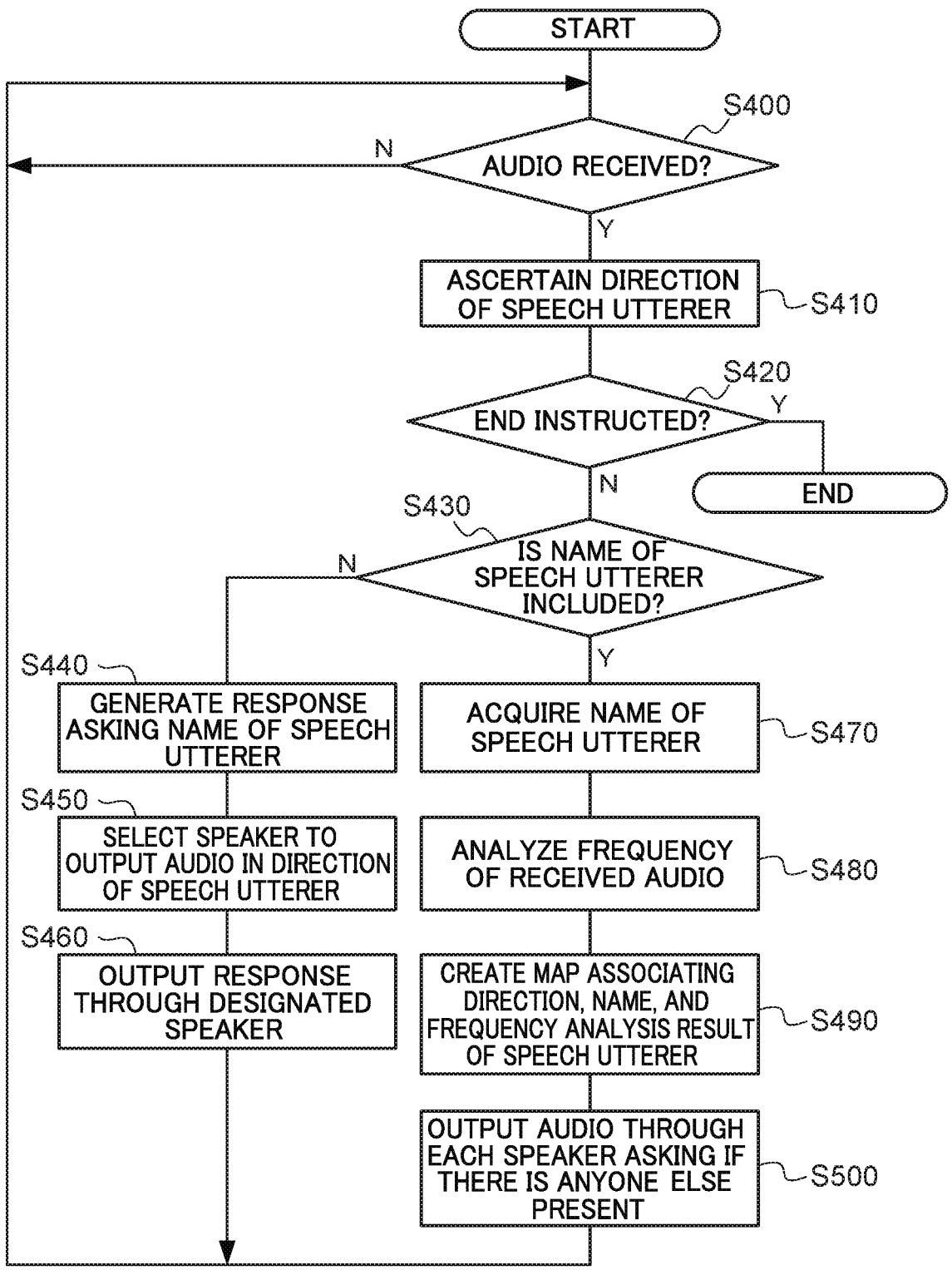
FIG. 13 is a flowchart illustrating an example of a flow of map creation processing.
Figure 14:
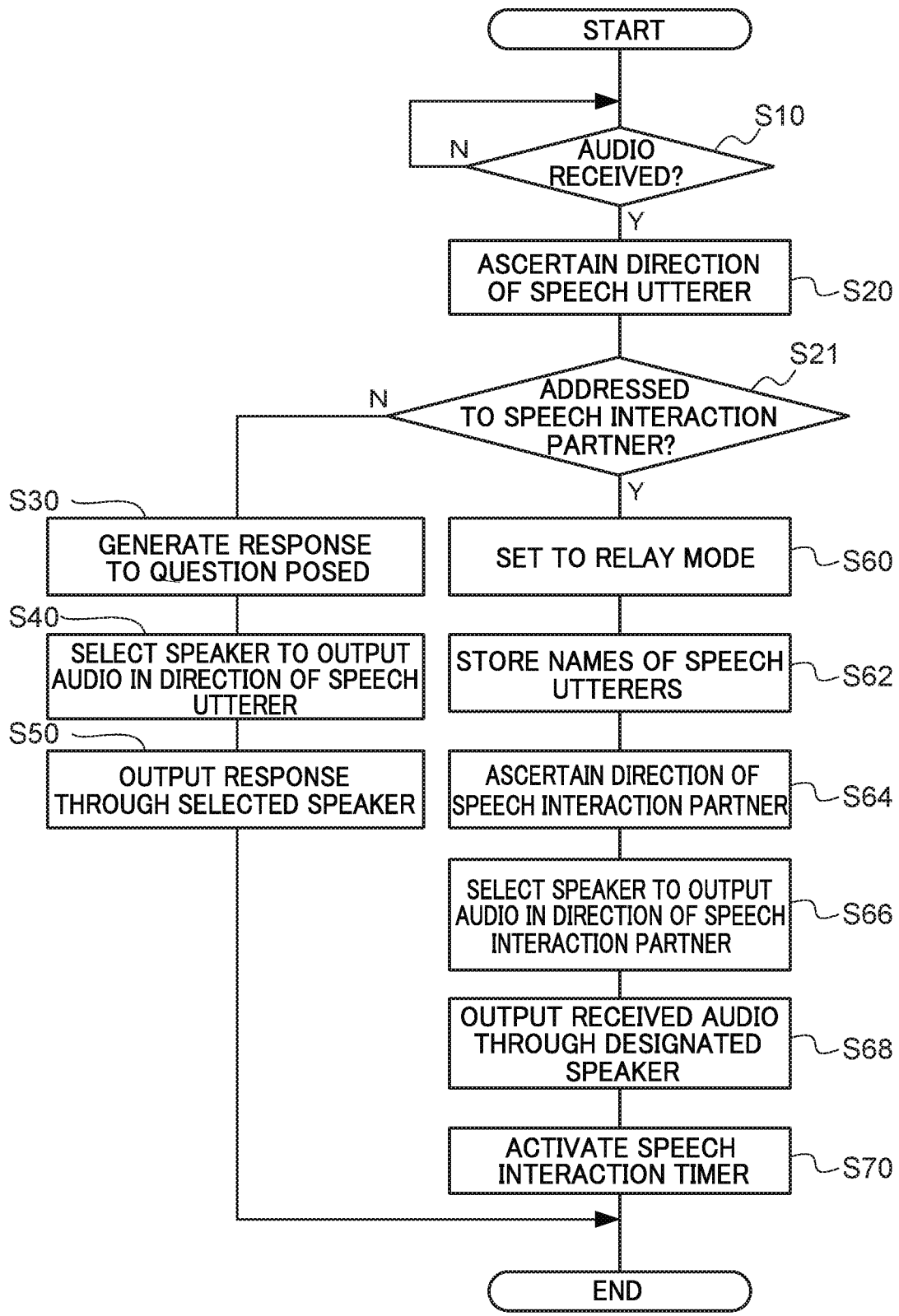
FIG. 14 is a flowchart illustrating an example of a flow of speech interaction processing corresponding to a relay mode.

Explanation follows regarding operation of the speech interaction device 10B according to the third exemplary embodiment, with reference to FIG. 13, FIG. 14, and FIG. 15.

FIG. 13 is a flowchart illustrating an example of a flow of map creation processing executed by the CPU 21 in cases in which, for example, a map creation instruction has been received by the speech interaction device 10B.

The map is a table in which information for ascertaining speech utterers who are within earshot of audio output through the speakers 12 of the speech interaction device 10B and who are participating in an interaction is associated with the directions of the speech utterers from the perspective of the speech interaction device 10B.

Note that a map creation instruction is performed by any speech utterer uttering words expressing an intention to request creation of a map, such as "Create a map", to the speech interaction device 10B.

A map creation program defining the map creation processing is pre-stored in the ROM 22 of the speech interaction device 10B, for example. The CPU 21 reads the map creation program stored in the ROM 22 to execute the map creation processing.

At step S400, similarly to at step S10 in FIG. 4, the CPU 21 determines whether or not audio has been received through at least one of the microphones 11. In cases in which audio has not been received, step S400 is repeatedly executed to monitor for the receipt of audio.

In cases in which some kind of audio has been received, processing transitions to step S410.

At step S410, the CPU 21 ascertains the direction of the speech utterer by ascertaining the direction from which the audio was emitted using a similar method to that of step S20 in FIG. 4.

At step S420, the CPU 21 determines whether or not an end instruction to end the map creation is included in the audio received at step S400.

In cases in which a mapping end instruction is included in the received audio, the map creation processing illustrated in FIG. 13 is ended. In cases in which a mapping end instruction is not included in the received audio, processing transitions to step S430.

Note that the mapping end instruction is performed by any speech utterer uttering words expressing an intention to request map creation be ended, such as "End map creation", to the speech interaction device 10B.

When creating the map, the identity of the speech utterer corresponding to the audio received at step S400 needs to be ascertained, and so at step S430, the CPU 21 determines whether or not the name of the speech utterer is included in the received audio. A determination result as to whether or not the name of the speech utterer is included in the received audio is obtained by analyzing the received audio using the learning model.

In cases in which determination is made that the name of the speech utterer is not included in the received audio in the determination processing of step S430, processing transitions to step S440.

At step S440, the CPU 21 generates a question phrase to ask the name of the speech utterer, such as "Who are you?", in order to acquire the identity of the speech utterer corresponding to the audio received at step S400.

At step S450, the CPU 21 performs similar processing to that of step S40 in FIG. 4 to select a speaker 12 to output audio in the direction of the speech utterer ascertained at step S410.

At step S460, the CPU 21 performs similar processing to that of step S50 in FIG. 4 to output the question phrase generated at step S440 through the speaker 12 selected at step S450. The name of a speech utterer whose name is unknown is asked in this manner.

After having executed step S460, the CPU 21 transitions to the control of step S400 to monitor for the receipt of any audio.

The speech utterer whose name was requested by the speech interaction device 10B utters their name, such as "This is Yamada", such that audio including their name is received at step S400. Accordingly, at step S430, the CPU 21 determines that the name of the speech utterer is included in the received audio, and processing transitions to step S470.

At step S470, the CPU 21 acquires the name of the speech utterer from the audio received at step S400. When the audio such as "This is Yamada" has been received at step S400, the CPU 21 acquires "Yamada" as corresponding to the name of the speech utterer. Note that the CPU 21 may employ a learning model for analyzing the meaning of words from audio in order to acquire the name of the speech utterer from the received audio.

At step S480, the CPU 21 employs a known frequency analysis method such as fast Fourier transform to execute frequency analysis of the audio received at step S400. Characteristics of the voice of the speech utterer are thereby obtained.

At step S490, the CPU 21 creates a map in which the direction of the speech utterer ascertained at step S410, the name of the speech utterer acquired at step S470, and the result of the frequency analysis of the speech utterer's voice acquired at step S480 are associated with each other, and stores the created map in the RAM 23.

At step S500, the CPU 21 generates a question phrase to pose a question to speech utterers in the surroundings of the speech interaction device 10B, such as "Is there anyone else?", in order to check whether or not any speech utterers who have not yet given a name still remain. The CPU 21 outputs the generated question phrase through each of the speakers 12 of the speech interaction device 10B, and control transitions to step S400.

If a speech utterer who has not yet given a name remains when this question is posed by the speech interaction device 10B, the CPU 21 anticipates that the speech utterer who has not yet given a name will speak to the speech interaction device 10B, and so the CPU 21 repeatedly executes the processing of steps S400 to S500 on the received audio until a mapping end instruction is received at step S420. The CPU 21 is thereby able to create a map associating the locations of the speech utterers from the perspective of the speech interaction device 10B with their respective voice qualities.

FIG. 14 is a flowchart illustrating an example of a flow of speech interaction processing executed by the CPU 21 after the map creation processing illustrated in FIG. 13 has ended.

A speech interaction program defining the speech interaction processing is pre-stored in the ROM 22 of the speech interaction device 10B, for example. The CPU 21 reads the speech interaction program stored in the ROM 22 to execute the speech interaction processing.

The flowchart illustrated in FIG. 14 differs from the flowchart of the speech interaction device 10 according to the first exemplary embodiment illustrated in FIG. 4 in the respect that the processing of step S21, and steps S60 to S70 has been added.

As an example, the start of interaction is triggered when a speech utterer addresses a speech interaction partner by name, for example saying "Hey, Yamada".

At step S21, the CPU 21 determines whether or not the name of the speech interaction partner is included in the audio received at step S10, and if so, whether or not an expression used to address the speech interaction partner is included in the audio received at step S10. A determination result as to whether or not the name of the speech interaction partner and an expression used to address the speech interaction partner are included in the received audio is obtained by analyzing the received audio using a learning model for analyzing the meaning of words in the audio.

In cases in which the name of the speech interaction partner and an expression used to address the speech interaction partner are not included in the received audio, the CPU 21 determines that people have not started a conversation between themselves and that the received audio is a question posed to the speech interaction device 10B, and processing transitions to step S30. The CPU 21 then executes the processing of steps S30, S40, and S50 previously described. The speech interaction device 10B thereby performs the same operation as the speech interaction device 10 according to the first exemplary embodiment, whereby a response to the question posed to the speech interaction device 10B is output through the speaker 12 facing toward the direction of the speech utterer who posed the question to the speech interaction device 10B.

However, in cases in which determination is made that the name of the speech interaction partner and an expression used to address the speech interaction partner are included in the received audio in the determination processing of step S21, processing transitions to step S60. Note that the CPU 21 stores the name of the speech interaction partner included in the received audio in the RAM 23.

At step S60, for example the CPU 21 sets a value of a variable indicating an operating mode stored in the RAM 23 to a value indicating a relay mode, thereby setting the speech interaction device 10B so as to operate in the relay mode.

At step S62, the CPU 21 refers to the map to ascertain the name of the speech utterer in the direction ascertained at step S20 as the identity of the speech utterer. Namely, the CPU 21 ascertains the name of the speech utterer who instigated the interaction.

The CPU 21 then associates the ascertained name of the speech utterer with the name of the speech interaction partner stored in the RAM 23 at step S21, and stores the associated information in the RAM 23 as a speech interaction table. Information regarding the participants in the interaction is thereby stored in the RAM 23. Note that in cases in which the speech utterer addresses plural people, such as by saying "Hey, Yamada and Tanaka", each person addressed by the speech utterer is stored in the speech interaction table as a speech interaction partner of the speech utterer.

At step S64, the CPU 21 refers to the map to ascertain the direction of the speech interaction partner with the name stored in the RAM 23 at step S21 from the perspective of the speech interaction device 10B.

At step S66, the CPU 21 selects a speaker 12 to output audio in the direction in of the speech interaction partner ascertained at step S64.

At step S68, the CPU 21 outputs the audio emitted by the speech utterer who instigated the interaction, as received at step S10, through the speaker 12 selected at step S66. The audio emitted by the speech utterer who instigated the interaction is thereby conveyed such that the audio emitted by the speech utterer is more heard clearly by the speech interaction partner than in cases in which audio is output through a speaker 12 that outputs audio in a different direction to the direction in which the speech interaction partner is present.

At step S70, the CPU 21 activates a speech interaction timer. For example, a timer function inbuilt in the CPU 21 may be utilized as the speech interaction timer.

Note that the "speech interaction timer" referred to here is a timer for determining whether or not an interaction that has started has ended. The speech interaction device 10B defines an interaction as having ended when a predetermined duration has elapsed since the speech utterer last uttered something without anybody responding. The predetermined duration for defining an interaction as having ended is a threshold value T1 (T1>0), which is stored in the non-volatile memory 24, for example. Note that the timer value of the speech interaction timer when the speech interaction timer has not been activated is zero.

The operation of the speech interaction device 10B can thus be switched to the relay mode as described above.

Note that at step S62 in FIG. 14, the name of the speech utterer who instigated the interaction is ascertained using the direction of the speech utterer ascertained at step S20. However, map also includes the frequency analysis result of the voice of the speech utterer. Thus, after executing frequency analysis of the audio received at step S10, the CPU 21 may refer to the map at step S62 to ascertain the person with the frequency analysis result closest to the obtained frequency analysis result as the speech utterer who started the interaction. In this case, if the position of the speech utterer has changed from the position when the map was created, the speech utterer can be ascertained more accurately than in cases in which the identity of the speech utterer is ascertained from the direction of the voice emitted by the speech utterer.

FIG. 15 is a flowchart illustrating an example of a flow of speech interaction processing corresponding to the relay mode executed by the CPU 21.

The speech interaction program defining the speech interaction processing is pre-stored in the ROM 22 of the speech interaction device 10B, for example. The CPU 21 reads the speech interaction program stored in the ROM 22 to execute the speech interaction processing.

After the CPU 21 has ascertained the direction of the speech utterer from the audio strength of the audio picked up by each of the microphones 11 using the CPU 21 at steps S10 and S20 previously described, step S23 is executed.

At step S23, the CPU 21 determines whether or not the timer value of the speech interaction timer is T1 or greater.

In cases in which the timer value of the speech interaction timer is T1 or greater, processing transitions to step S25.

Such cases indicate that an utterance-free state has continued for T1 or greater since the last utterance by a speech utterer, enabling the inference that the interaction between the participants in the interaction has ended for the time being. Thus, at step S25, for example, the CPU 21 changes the variable value stored in the RAM 23 to indicate the operating mode to a different value than the value indicating the relay mode, and the relay mode is deactivated.

In cases in which determination is made that the timer value of the speech interaction timer is less than T1 at step S23, or in cases in which step S25 has been executed, processing transitions to step S27.

At step S27, the CPU 21 determines whether or not the operating mode of the speech interaction device 10B is the relay mode. In cases in which the operating mode of the speech interaction device 10B is not the relay mode, processing transitions to step S29.

At step S29, the CPU 21 stops the speech interaction timer and resets the timer value of the speech interaction timer to zero.

In this case, the operating mode of the speech interaction device 10B is not the relay mode, and so the CPU 21 establishes that the audio received at step S10 is a question posed to the speech interaction device 10B. The CPU 21 then executes steps S30, S40, and S50 previously described. The speech interaction device 10B thereby performs the same operation as the speech interaction device 10 according to the first exemplary embodiment, whereby a response to the question posed to the speech interaction device 10B is output through the speaker 12 facing toward the direction of the speech utterer who posed the question to the speech interaction device 10B.

In cases in which the operating mode of the speech interaction device 10B is determined to be the relay mode in the determination processing of step S27, processing transitions to step S80.

At step S80, the CPU 21 refers to the map to ascertain the identity of the speech utterer present in the direction ascertained at step S20. Namely, the CPU 21 ascertains the name of the speech utterer who is speaking.

At step S82, the CPU 21 refers to the speech interaction table created at step S62 in FIG. 14 to ascertain the speech interaction partner of the speech utterer ascertained at step S80.

The CPU 21 also refers to the map to ascertain the direction in which the speech interaction partner of the speech utterer is present.

At step S84, the CPU 21 selects a speaker 12 to output audio toward the direction in which the speech interaction partner ascertained at step S82 is present.

At step S86, the CPU 21 outputs the audio emitted by the speech utterer that was received at step S10 through the speaker 12 selected at step S84. This completes the speech interaction processing illustrated in FIG. 15.

Note that at step S80 in FIG. 15, the CPU 21 ascertains the speech utterer using the direction of the speech utterer ascertained at step S20. However, the map also includes the frequency analysis result of the voice of the speech utterer. Thus, at step S80, after having executed frequency analysis on the audio received at step S10, the CPU 21 may refer to the map to ascertain the person with the nearest frequency analysis result to the obtained frequency analysis result as the speech utterer. In this case, if the position of the speech utterer has changed partway through the interaction, the speech utterer can be ascertained more accurately than in cases in which the identity of the speech utterer is ascertained from the direction of the voice emitted by the speech utterer.

Thus, the speech interaction device 10B according to the third exemplary embodiment autonomously determines the start of an interaction between participants, and relays the voice of the speech utterer by setting the speech interaction device 10B to relay mode and outputting the voice of the speech utterer through the speaker 12 facing toward the direction in which the speech interaction partner is present. The audio emitted by the speech utterer is thus passed on so as to be more heard clearly by the speech interaction partner than in cases in which the direction in which the speech interaction partner is present is not ascertained, and the audio emitted by the speech utterer is output through a speaker 12 facing toward a different direction to the direction in which the speech interaction partner is present.

Note that in each of the flowcharts in FIG. 13 to FIG. 15, the directionality of the audio output through the speakers 12 when outputting audio from the speech interaction device 10B toward the speech utterer or the speech interaction partner is controlled by outputting the audio only through the speaker 12 facing toward the direction of the speech utterer or the speech interaction partner. However, the control method used to deliver audio more clearly in the direction of the speech utterer or the speech interaction partner than in other directions is not limited thereto.

For example, as explained in the first exemplary embodiment, the CPU 21 may control the sound volume of each of the speakers 12 such that the sound volume of the speaker 12 facing toward the direction of the speech utterer or the speech interaction partner is greater than the sound volume of the other speakers 12.

The present disclosure has been explained above using the respective exemplary embodiments; however, the scope of the present disclosure is not limited to the respective exemplary embodiments. Various modifications and improvements may be made to the respective exemplary embodiments within a range not departing from the spirit of the present disclosure, and embodiments including these modifications and improvements are included within the technical scope of the present disclosure. For example, processing sequences may be changed within a range not departing from the spirit of the present disclosure.

In the respective exemplary embodiments, an example is given in which the respective processing is implemented using software. However, equivalent processing to that in the flowcharts illustrated in FIG. 4 to FIG. 7, FIG. 11, and FIG. 13 to FIG. 15 may, for example, be packaged in an application specific integrated circuit (ASIC) such that the processing is performed by hardware. In such cases, faster processing may be expected than when the respective processing is implemented using software.

In the respective exemplary embodiments described above, configurations have been explained in which the respective programs are installed in the ROM 22; however, configuration is not limited thereto. The respective programs according to the present disclosure may be provided in a format recorded on a computer-readable storage medium. For example, the respective programs according to the present disclosure may be provided in a format recorded on an optical disc such as a compact disc (CD)-ROM or a digital versatile disc (DVD)-ROM. Alternatively, the respective programs according to the present disclosure may be provided in a format recorded on semiconductor memory such as universal serial bus (USB) memory or flash memory. The speech interaction device 10, 10A, 10B may download the respective programs according to the present disclosure from a storage device connected to the communication line 30.

What is claimed is:

1. A speech interaction device comprising:
an ascertaining section that ascertains a direction of a speech utterer by audio emitted by the speech utterer; and
a control section that gathers information regarding an easy-to-hear frequency band for the speech utterer and controls directionality of audio output through a speaker of a plurality of speakers when outputting audio toward the speech utterer, such that directionality of audio in the direction ascertained by the ascertaining section is higher than directionality of audio in other directions and that a predetermined standard sound quality according to the speech utterer is modulated such that audio strength within the easy-to-hear frequency band is greater than audio strength within the easy-to-hear frequency band in audio having the predetermined standard sound quality.

2. The speech interaction device of claim 1, wherein:
the ascertaining section ascertains a direction of a driver driving a vehicle, by audio; and
when information relating to driving of the vehicle has been acquired from a driving assistance device that assists driving of the vehicle, the control section controls directionality of audio output through a speaker of the plurality of speakers such that directionality of audio conveying the information is higher in the direction in which the driver is present as ascertained by the ascertaining section than in another direction.

3. The speech interaction device of claim 2, wherein the driving assistance device is a car navigation device pre-installed in the vehicle, or a portable information device including a car navigation function.

4. The speech interaction device of claim 1, wherein:
the control section selects a speaker of the plurality of speakers to output audio in the direction in which the speech utterer is present, as ascertained by the ascertaining section, and controls such that the audio is output through the selected speaker.

5. The speech interaction device of claim 1, wherein:
the control section controls respective sound volumes of the plurality of speakers such that a sound volume of a speaker of the plurality of speakers for outputting audio in the direction in which the speech utterer is present, as ascertained by the ascertaining section, is greater than a sound volume of another speaker of the plurality of speakers for outputting audio in another direction.

* * * * *